(12) United States Patent
Aoki

(10) Patent No.: US 10,230,219 B2
(45) Date of Patent: Mar. 12, 2019

(54) STORAGE MODULE

(71) Applicant: Hitachi Automotive Systems, Ltd., Hitachinaka-shi, Ibaraki (JP)

(72) Inventor: Sadayuki Aoki, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 276 days.

(21) Appl. No.: 15/314,233

(22) PCT Filed: May 29, 2014

(86) PCT No.: PCT/JP2014/064311
§ 371 (c)(1),
(2) Date: Nov. 28, 2016

(87) PCT Pub. No.: WO2015/181930
PCT Pub. Date: Dec. 3, 2015

(65) Prior Publication Data
US 2017/0194771 A1    Jul. 6, 2017

(51) Int. Cl.
*H02B 1/01* (2006.01)
*H02B 1/21* (2006.01)
*H01M 10/60* (2014.01)
*H01M 2/10* (2006.01)
*H01M 10/48* (2006.01)
*G01K 1/14* (2006.01)
*H01M 2/20* (2006.01)

(52) U.S. Cl.
CPC ............... *H02B 1/21* (2013.01); *G01K 1/146* (2013.01); *H01M 2/1077* (2013.01); *H01M 10/486* (2013.01); *H01M 10/60* (2015.04); *H02B 1/01* (2013.01); *H01M 2/206* (2013.01); *H01M 2200/10* (2013.01)

(58) Field of Classification Search
None
See application file for complete search history.

(56) References Cited

U.S. PATENT DOCUMENTS

2006/0103346 A1    5/2006  Misu et al.
2010/0285340 A1   11/2010  Matsunaga
(Continued)

FOREIGN PATENT DOCUMENTS

EP     1 069 629 A2    1/2001
JP    2006-140054 A    6/2006
(Continued)

OTHER PUBLICATIONS

Extended European Search Report issued in counterpart European Application No. 14893595.0 dated Oct. 12, 2017 (7 pages).
(Continued)

*Primary Examiner* — Sarah A. Slifka
(74) *Attorney, Agent, or Firm* — Crowell & Moring LLP

(57) ABSTRACT

A storage module in which a plurality of storage elements are electrically connected by bus bars includes: a temperature sensor which contacts a surface of the storage element and detects a temperature of the storage element; a pressing member which presses the temperature sensor to the storage element; and a regulation member which regulates a movement of the temperature sensor in a direction orthogonal to a pressing direction of the pressing member.

10 Claims, 24 Drawing Sheets

(56) References Cited

U.S. PATENT DOCUMENTS

2012/0009447 A1    1/2012   Ikeda et al.
2013/0323552 A1    12/2013   Kurita

FOREIGN PATENT DOCUMENTS

| JP | 2009-176601 A | | 8/2009 |
| JP | 2013251294 | * | 6/2013 |
| JP | 2013-171697 A | | 9/2013 |
| JP | 2013-251294 A | | 12/2013 |
| WO | WO 2009/093758 A1 | | 7/2009 |

OTHER PUBLICATIONS

Cover page of EP 2 235 486 A0 Published Oct. 6, 2010 (1 page).
International Search Report (PCT/ISA/210) issued in PCT Application No. PCT/JP2014/064311 dated Jul. 22, 2014 with English translation (5 pages).

* cited by examiner

FIG. 12
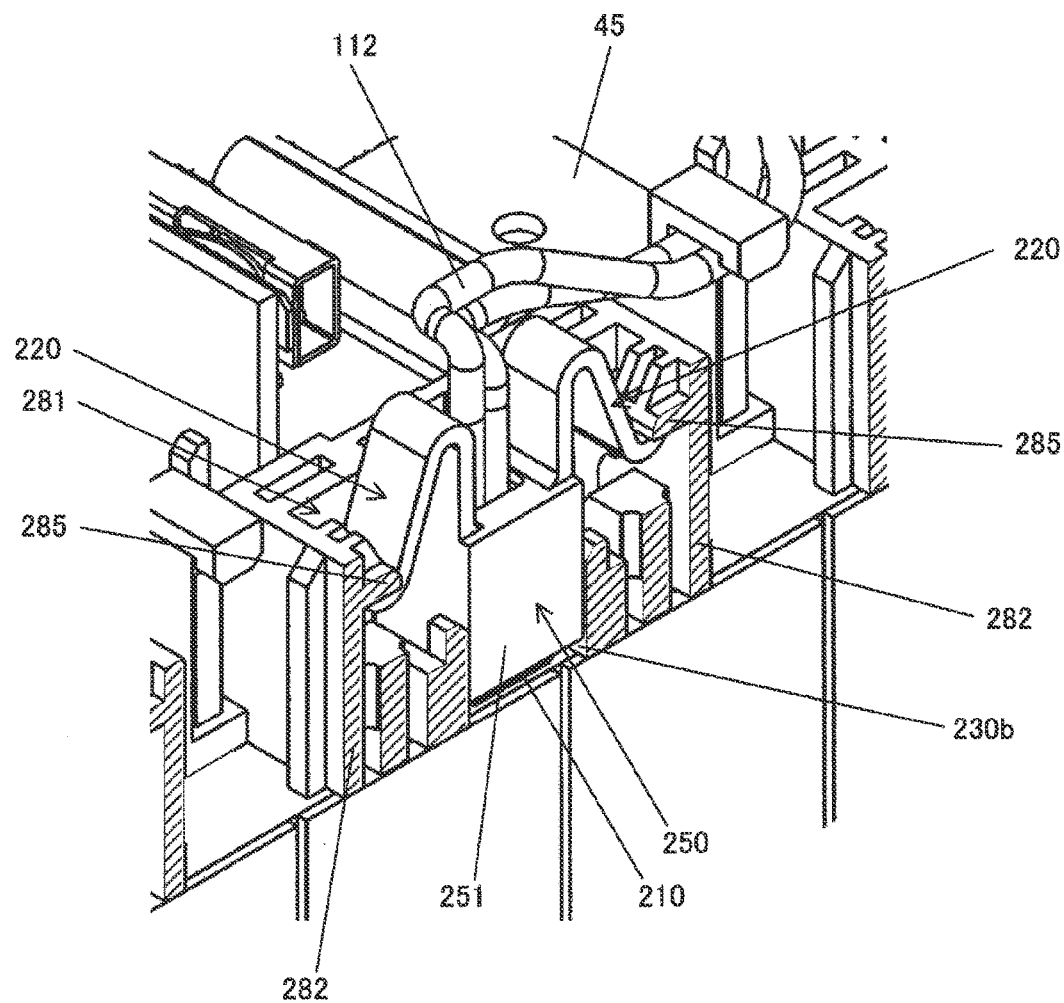
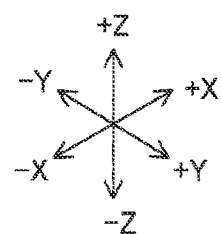

STORAGE MODULE

TECHNICAL FIELD

The present invention relates to a storage module.

BACKGROUND ART

Conventionally, a storage module including a plurality of storage elements such as lithium ion secondary batteries is known as a power supply of a pure electric vehicle, a hybrid electric vehicle, or the like. In the storage module used for the electric vehicle, because a large current flows at the time of charging/discharging, a temperature of the storage element increases greatly due to heat generation according to the charging/discharging.

For this reason, technology for controlling the temperature of the storage element is recently developed. To control the temperature of the storage element appropriately, it is demanded to detect the temperature of the storage element with high precision by a temperature sensor.

A secondary battery including a temperature detector (temperature sensor) to detect a surface temperature of a battery case is described in PTL 1. In the temperature sensor described in PTL 1, a fixing portion of the temperature sensor engages with two support members disposed on both sides of the battery case and a detection body portion is fixed on the secondary battery while maintain a contact state with a surface of the battery case.

CITATION LIST

Patent Literature

PTL 1: JP 2006-140054 A

SUMMARY OF INVENTION

Technical Problem

In the temperature sensor described in PTL 1, the fixing portion is configured to be elastically deformable in a direction linking an engagement portion of the fixing portion side and the detection body portion among directions along the contact surface of the detection body portion. For this reason, when a vibration is applied to the storage module, the contact state of the detection body portion and the battery case may not be maintained. As a result, it is difficult to detect the temperature of the battery with high precision.

Solution to Problem

According to a first aspect of the present invention, a storage module in which a plurality of storage elements are electrically connected by bus bars includes: a temperature sensor which contacts a surface of the storage element and detects a temperature of the storage element; a pressing member which presses the temperature sensor to the storage element; and a regulation member which regulates a movement of the temperature sensor in a direction orthogonal to a pressing direction of the pressing member.

Advantageous Effects of Invention

According to the present invention, even when a vibration is applied to a storage module, a temperature of a storage element can be detected with high precision.

BRIEF DESCRIPTION OF DRAWINGS

FIG. 12 is a partial cross-sectional enlarged perspective view illustrating a sensor mounting portion on which a temperature sensor is mounted.

DESCRIPTION OF EMBODIMENTS

Embodiments in which the present invention is applied to a storage module that is embedded in a storage device mounted on a hybrid electric vehicle or a pure electric vehicle and includes a plurality of square lithium ion secondary batteries (hereinafter, referred to as the unit batteries) as storage elements are hereinafter described with reference to the drawings.

First Embodiment

Figure 1:
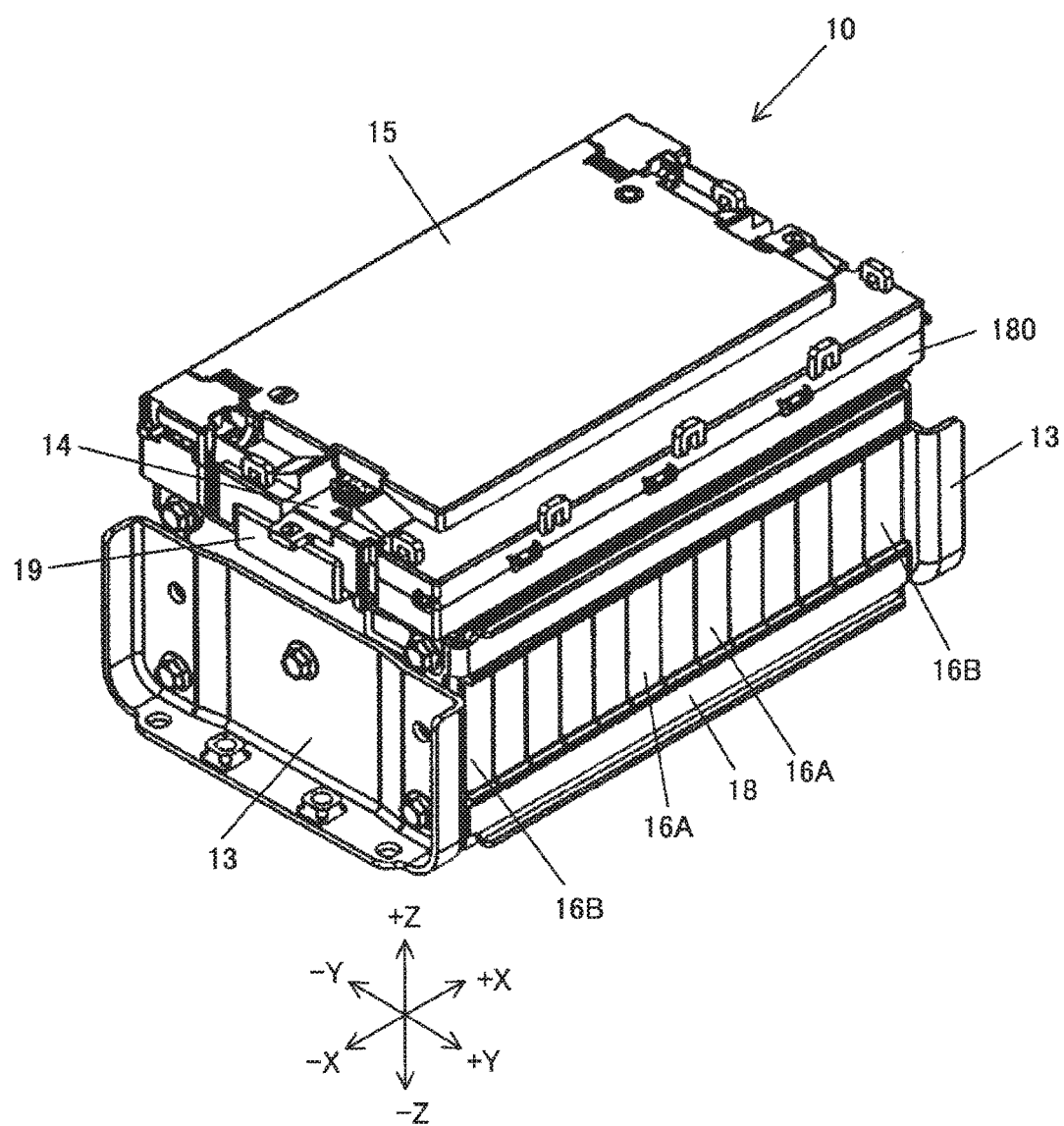
FIG. 1 is an external perspective view of a storage module according to a first embodiment of the present invention.
Figure 2:
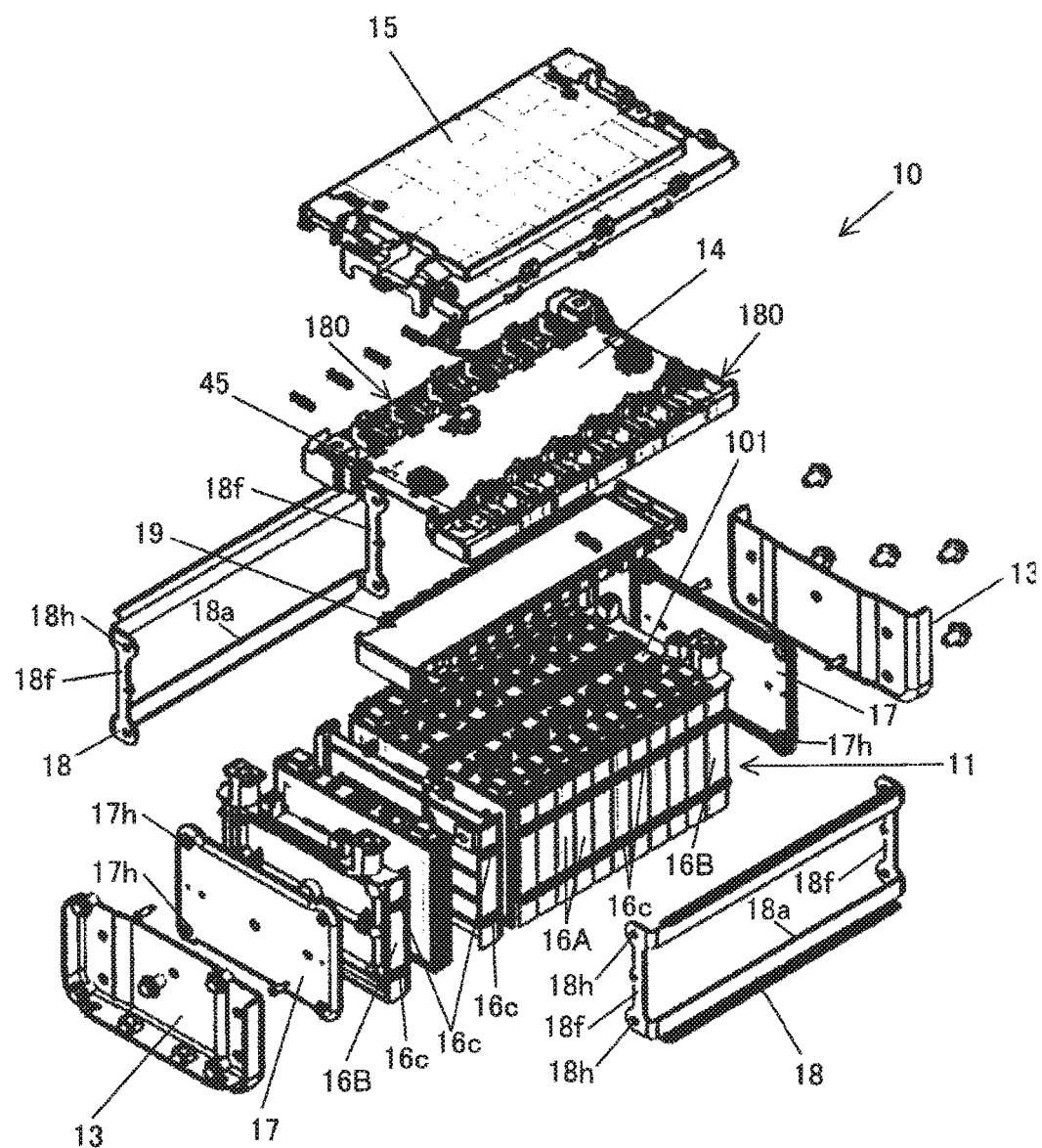
FIG. 2 is an exploded perspective view of the storage module.

FIG. 1 is an external perspective view of a storage module 10 according to a first embodiment of the present invention and FIG. 2 is an exploded perspective view illustrating a configuration of the storage module 10. In the following description, as illustrated in the drawings, a longitudinal direction of the storage module 10, that is, a lamination direction of unit batteries 101 is defined as an X direction. The battery lid side where an electrode terminal of a positive electrode (hereinafter, referred to as a positive electrode terminal 104) and an electrode terminal of a negative electrode (hereinafter, referred to as a negative electrode terminal 105) are provided is described as the upper side (+Z side) of the storage module 10, the battery bottom surface side is described as the lower side (−Z side) of the storage module 10, and a vertical direction of the storage module 10 is defined as a Z direction. A direction orthogonal to each of the X direction and the Z direction, that is, a width direction of the storage module 10 is described as a Y direction.

As illustrated in FIG. 2, the storage module 10 includes an element laminate 11 in which a plurality of unit batteries 101 are laminated and arranged, an integration mechanism to integrate the element laminate 11, a duct device 19, a control circuit board 14, and a module cover 15.

Figure 3:
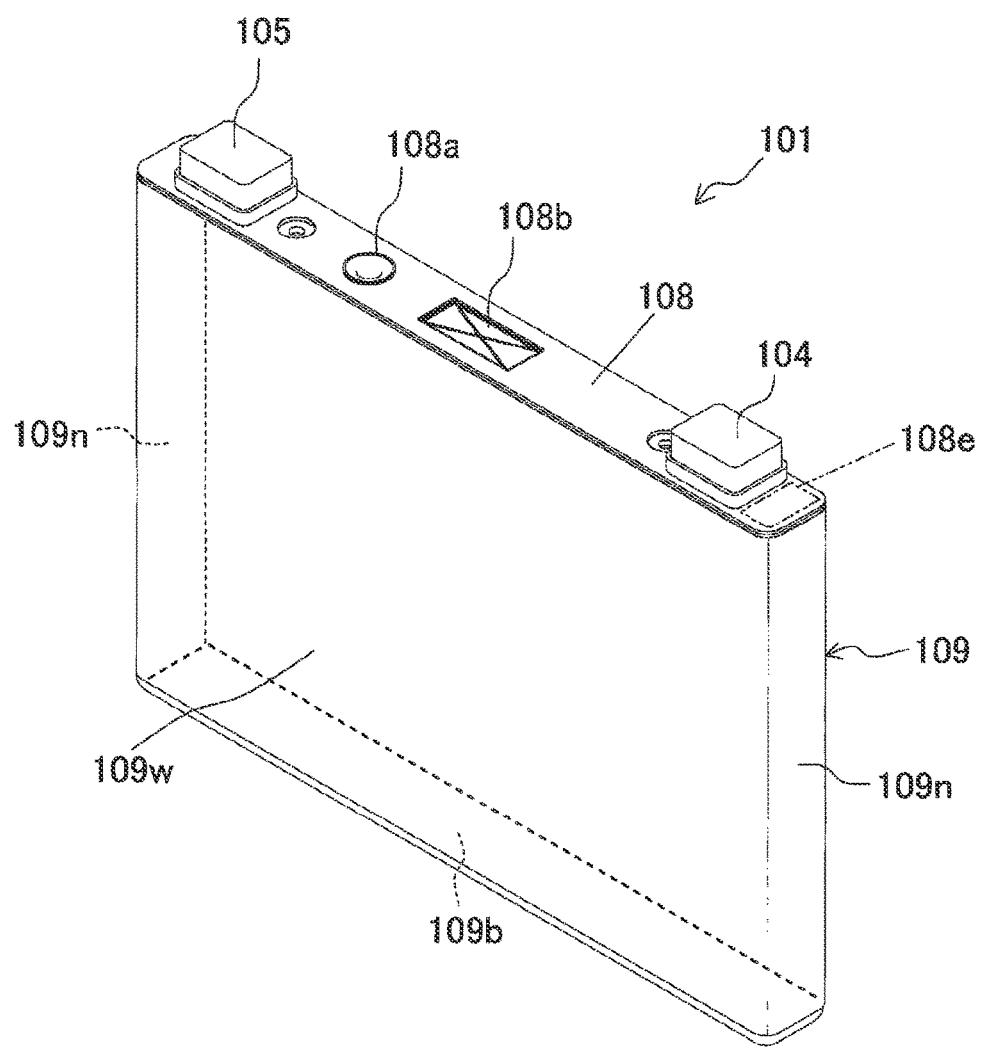
FIG. 3 is a perspective view of a unit battery.

A shape of each unit battery 101 is a shape of a flat rectangular parallelepiped and each unit battery 101 has a pair of wide lateral plates 109w (refer to FIG. 3). The plurality of unit batteries 101 configuring the element laminate 11 are laminated and arranged, such that the wide lateral plates 109w of the unit batteries 101 adjacent to each other face each other. Directions of the unit batteries 101 adjacent to each other are inverted and the unit batteries 101 are arranged, such that positions of the positive electrode terminal 104 and the negative electrode terminal 105 provided in the battery lid 108 are reversed.

The positive electrode terminal 104 and the negative electrode terminal 105 of each of the unit batteries 101 adjacent to each other are electrically connected by a bus bar 45 (refer to FIGS. 5 and 6) to be a conductive member that is made of a metal and has a flat plate shape. That is, the plurality of unit batteries 101 configuring the storage module 10 according to this embodiment are electrically connected in series.

Although not illustrated in the drawings, the positive electrode terminal 104 of the unit battery 101 disposed on one end and the negative electrode terminal 105 of the unit battery 101 disposed on the other end are electrically connected to other storage module in series or parallel by a conductive member or are connected to a wiring line for power extraction by the conductive member.

The integration mechanism is configured to include a pair of fixing members 13, a pair of end plates 17, a pair of side frames 18, a plurality of cell holders 16A and 16B, and a plurality of bolts. As illustrated in FIGS. 1 and 2, the cell holder 16A for a middle is disposed between the unit batteries 101 adjacent to each other and the cell holder 16B for an end is disposed between the unit battery 101 and the end plate 17 disposed on both ends. The plurality of unit batteries 101 that are laminated and arranged are held by the cell holders 16A and 16B and are interposed by the pair of end plates 17 from both end sides of the X direction. The end plate 17 has a shape of a rectangular flat plate corresponding to the wide lateral plate 109w (refer to FIG. 3) of the unit battery 101.

Materials of the cell holder 16A for the middle and the cell holder 16B for the end are insulating resins. Protrusion portions 16c protruding in the Y direction are provided on lateral surfaces of the cell holders 16A and 16B.

The plurality of unit batteries 101 and the cell holders 16A and 16B are lashed by the pair of side frames 18, in a state in which the plurality of unit batteries 101 and the cell holders 16A and 16B are interposed by the pair of end plates 17. As illustrated in FIG. 2, the pair of side frames 18 are disposed to face each other at the +Y side and the −Y side of the element laminate 11. Each of the pair of side frames 18 includes a pair of flanges 18f that are provided at both ends of the X direction and an opening 18a that is provided between the pair of flanges 18f. A through-hole 18h is provided in each flange 18f and a screw hole 17h is provided in the end plate 17.

The openings 18a of the side frames 18 are fitted into the protrusion portions 16c of the cell holders 16A and 16B from the outside of the Y direction. The flange 18f contacts the end plate 17. A fixing screw (fastening member) is inserted into the through-hole 18h of the side frame 18 from the outside of the X direction of the end plate 17 and the fixing screw is screwed into the screw hole 17h of the end plate 17, so that the side frame 18 is attached to the end plate 17. As a result, as illustrated in FIG. 1, the individual unit batteries 101 interposed by the pair of end plates 17 are held by the end plates 17 via the individual cell holders 16A and 16B.

The fixing screw that is screwed into the screw hole 17h of the lower side of the end plate 17 illustrated in FIG. 2 is inserted into the through-hole 18h of the side frame 18 via a through-hole of the fixing member 13. In the fixing member 13, the fixing screw is inserted into each of a center through-hole and through-holes of both ends of the Y direction in the vicinity of ends of the lower side. The fixing member 13 is screwed into the screw hole 17h of the end plate 17. Thereby, the fixing member 13 is fixed on the end plate 17. The fixing member 13 is fixed on a predetermined position in a vehicle, so that the storage module 10 is fixed on the vehicle.

The unit batteries 101 configuring the element laminate 11 will be described. The plurality of unit batteries 101 have the same structures. FIG. 3 is a perspective view of the unit battery 101. As illustrated in FIG. 3, the unit battery 101 includes a square battery container that includes a battery can 109 and the battery lid 108. Materials of the battery can 109 and the battery lid 108 are aluminum or an aluminum alloy, for example. The battery can 109 has a shape of a rectangular box with an opening provided at one end. The battery lid 108 has a shape of a rectangular flat plate and is laser-welded to close the opening of the battery can 109. That is, the battery lid 108 seals the battery can 109.

The square battery container including the battery lid 108 and the battery can 109 has a shape of a hollow rectangular parallelepiped. In the battery container, the pair of wide lateral plates 109w having surfaces (wide surfaces) with largest areas among lateral surfaces configuring the battery container face each other, a pair of narrow lateral plates 109n having surfaces with smallest areas among the lateral surfaces configuring the battery container face each other, and the battery lid 108 and a bottom plate 109b of the battery can 109 face each other.

The positive electrode terminal 104 and the negative electrode terminal 105 are provided in the battery lid 108. A charge/discharge element (not illustrated in the drawings) is stored in the battery container in a state in which the charge/discharge element is covered with an insulating case (not illustrated in the drawings). A positive electrode of the charge/discharge element not illustrated in the drawings is connected to the positive electrode terminal 104 and a negative electrode of the charge/discharge element is connected to the negative electrode terminal 105. For this reason, power is supplied to an external apparatus via the positive electrode terminal 104 and the negative electrode terminal 105 or externally generated power is supplied to the charge/discharge element via the positive electrode terminal 104 and the negative electrode terminal 105 and charging is performed.

A liquid injection hole to inject an electrolytic solution into the battery container is provided in the battery lid 108. The liquid injection hole is sealed by a liquid injection plug 108a after injecting the electrolytic solution.

A gas discharge valve 108b is provided between the positive electrode terminal 104 and the negative electrode terminal 105 in the battery lid 108. The gas discharge valve 108b is formed by thinning the battery lid 108 partially by press working. A thin film member may be attached to an opening of the battery lid 108 by laser welding and a thin portion may be used as the gas discharge valve. The gas discharge valve 108b cleaves when the unit battery 101 generates heat due to abnormality such as overcharging, gas is generated, and an internal pressure of the battery container increases and reaches a predetermined pressure, discharges the gas from the container, and decreases the internal pressure of the battery container.

As illustrated in FIGS. 1 and 2, the duct device 19 to guide the gas discharged from the gas discharge valve 108b of each of the plurality of unit batteries 101 to a predetermined place is provided on the element laminate 11. The duct device 19 has a flow channel of a rectangular cross-section extending along the X direction. Although not illustrated in the drawings, in the duct device 19, an opening for gas introduction is formed at a position corresponding to the gas discharge valve 108b of each unit battery 101.

The control circuit board 14 is disposed on the duct device 19 and a bus bar cover 180 is disposed at each of the +Y side and the −Y side of the duct device 19. The module cover 15 is disposed on the control circuit board 14 and the bus bar cover 180 and a portion on the element laminate 11 is covered with the module cover 15. An engagement claw 180f provided in the bus bar cover 180 engages with an engagement portion 16f provided in the cell holder 16A, so that the bus bar cover 180 is fixed on the cell holder 16A (refer to FIG. 6).

Figure 4:
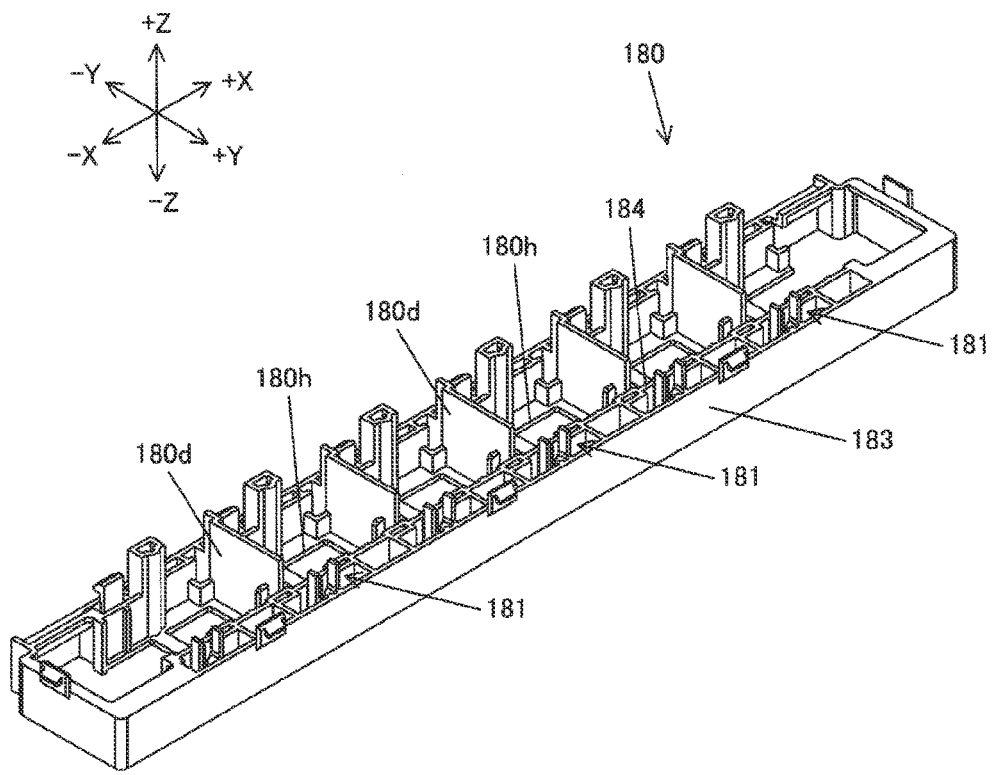
FIG. 4 is a perspective view of a bus bar cover.

FIG. 4 is a perspective view of the bus bar cover 180. Because the pair of bus bar covers 180 disposed on the +Y side and the −Y side of the duct device 19 has the same configuration, the bus bar cover 180 of the +Y side of the storage module 10 illustrated in FIGS. 1 and 2 is described representatively.

The bus bar cover 180 is formed of a POM (polyoxymethylene resin or polyacetal resin) material. Openings 180h into which the positive electrode terminal 104 and the negative electrode terminal 105 of the unit battery 101 are inserted are formed in the bus bar cover 180. The bus bars 45 (refer to FIGS. 5 and 6) are connected to the positive electrode terminal 104 and the negative electrode terminal 105 protruding from the openings 180h in an upward direction (+Z direction) by laser welding. The positive electrode terminals 104 and the negative electrode terminals 105 of the unit batteries 101 adjacent to each other in the X direction are electrically connected by the bus bars 45.

In the bus bar cover 180, an insulating plate 180d is disposed between one bus bar 45 and other bus bar 45 adjacent to each other and an insulating creeping distance is secured.

A plurality of sensor mounting portions 181 are formed in outside ends of the Y direction (+Y-side ends in the drawings) of the pair of bus bar covers 180. Each sensor mounting portion 181 is formed at a position corresponding to a contact region 108e (refer to FIG. 3) of a temperature sensor 110 between an end of the battery lid 108 of the side of the positive electrode terminal 104 of each unit battery 101 and the positive electrode terminal 104. The sensor mounting portion 181 is a portion on which the temperature sensor 110 to be described below is mounted. In this embodiment, the temperature sensors 110 are disposed with respect to all of the unit batteries 101 and temperatures of the individual unit batteries 101 are detected.

Figure 5:
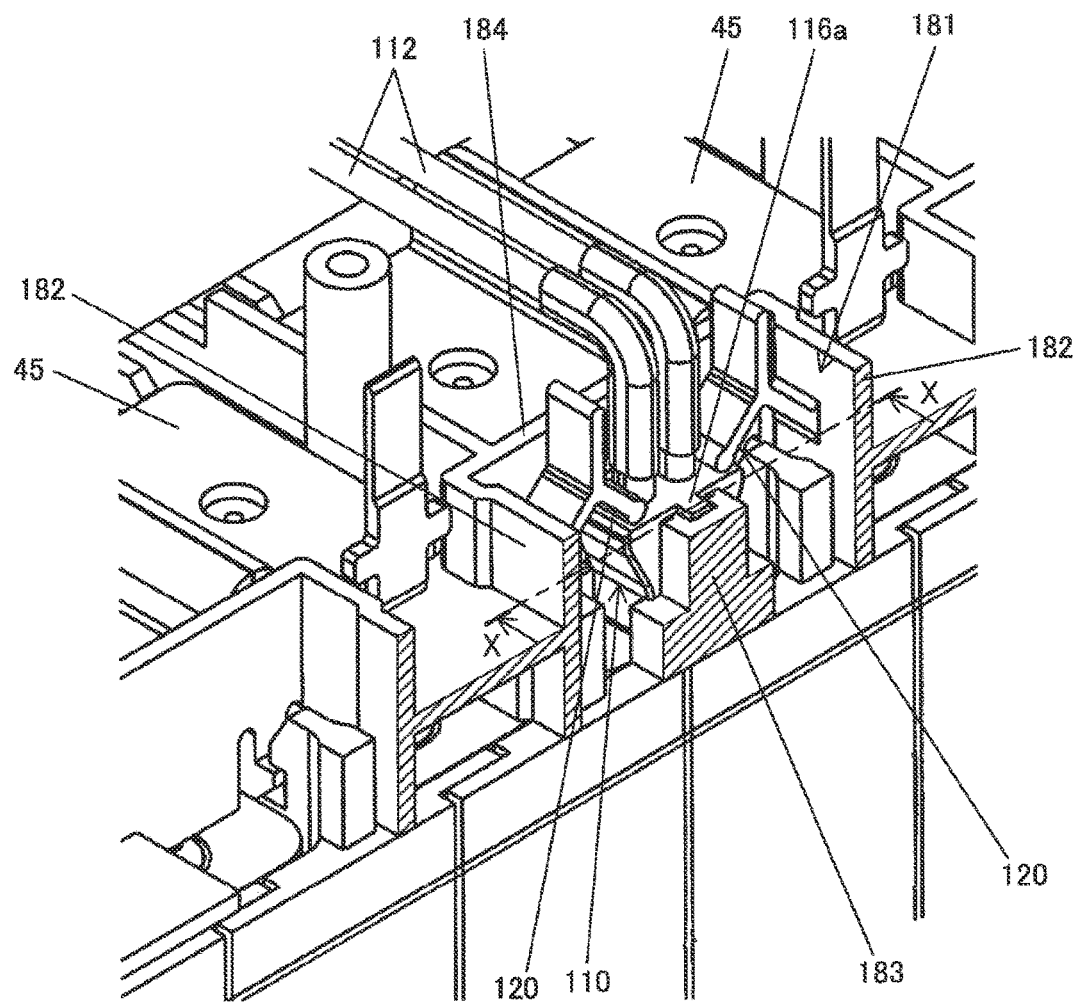
FIG. 5 is a partial cross-sectional enlarged perspective view illustrating a sensor mounting portion on which a temperature sensor is mounted.
Figure 6:
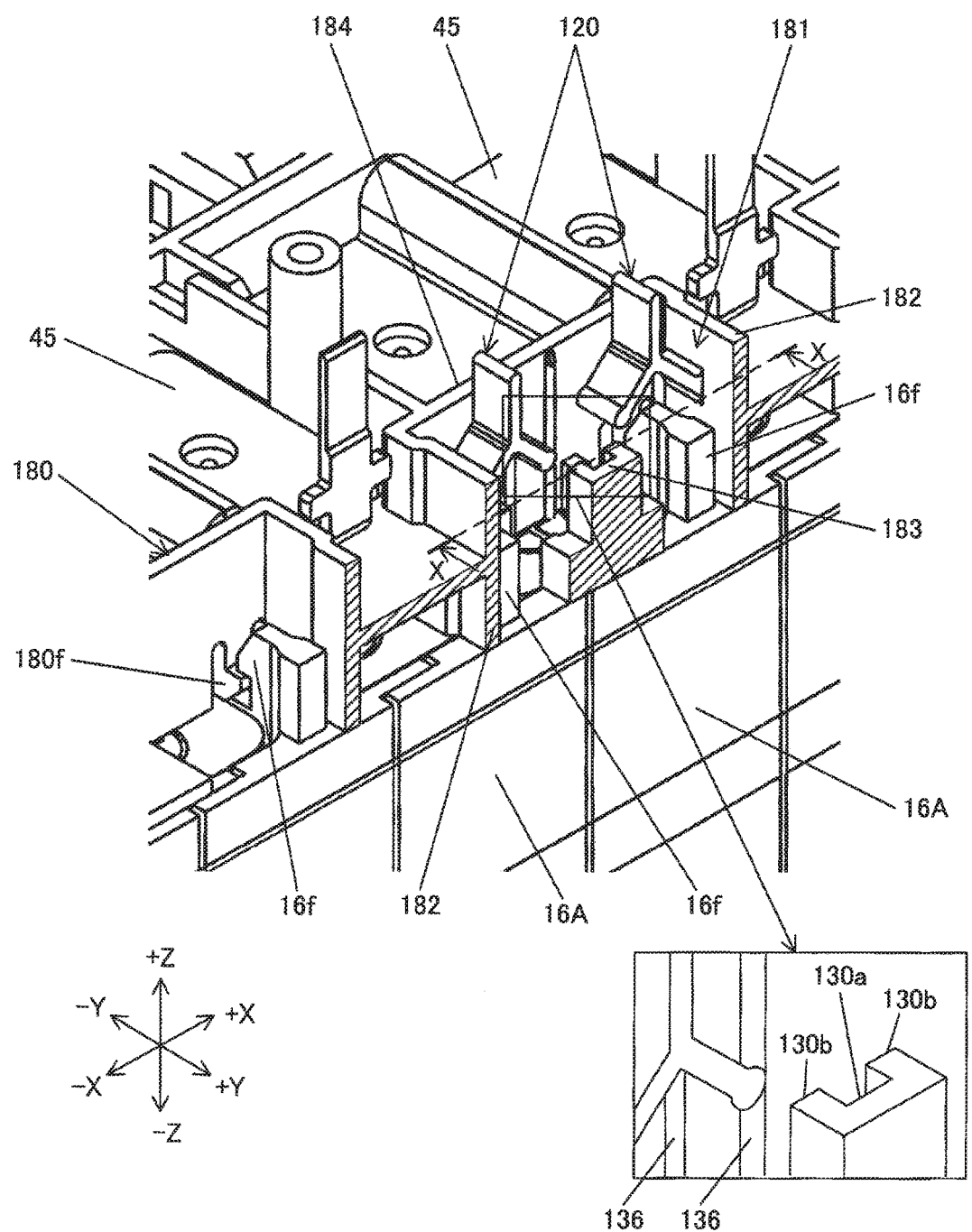
FIG. 6 is a partial cross-sectional enlarged perspective view illustrating the sensor mounting portion on which the temperature sensor is not mounted.

FIGS. 5 and 6 are partial cross-sectional enlarged perspective views illustrating the sensor mounting portion 181. In FIGS. 5 and 6, a part of the bus bar cover 180 is cut along an XZ plane to describe the configuration of the sensor mounting portion 181 and the bus bar cover 180 is illustrated. FIGS. 5 and 6 illustrate the sensor mounting portion 181 of the bus bar cover 180 of the +Y side of the storage module 10 illustrated in FIGS. 1 and 2. FIG. 5 illustrates a state in which the temperature sensor 110 is mounted and FIG. 6 illustrates a state in which the temperature sensor 110 is not mounted. Because each sensor mounting portion 181 has the same configuration, one sensor mounting portion 181 is described representatively.

The sensor mounting portion 181 forms a space where the temperature sensor 110 is disposed, by a pair of holding plates 182, an outside regulation plate 183 located at the outside of the Y direction (+Y side in the drawings), and an inside regulation plate 184 located at the inside of the Y direction (−Y side in the drawings). As illustrated in FIG. 5, the temperature sensor 110 to detect the temperature of the unit battery 101 is mounted on the sensor mounting portion 181.

As illustrated in FIGS. 5 and 6, a pair of pressing blades 120 to press the temperature sensor 110 to the battery lid 108 of the unit battery 101, that is, press the temperature sensor 110 in a downward direction (−Z direction) is provided in the sensor mounting portion 181 of the bus bar cover 180. The temperature sensor 110 is disposed to be interposed by the outside regulation plate 183 and the inside regulation plate 184 and movements of the temperature sensor 110 in directions (the X direction and the Y direction) orthogonal to a pressing direction (the Z direction) of the pressing blade 120 are regulated.

The temperature sensor 110, the pressing blade 120, the outside regulation plate 183, and the inside regulation plate 184 will be described in detail. Each component will be described on the basis of the X direction, the Y direction, and the Z direction in a state in which each component is mounted on the storage module 10.

Figure 7:
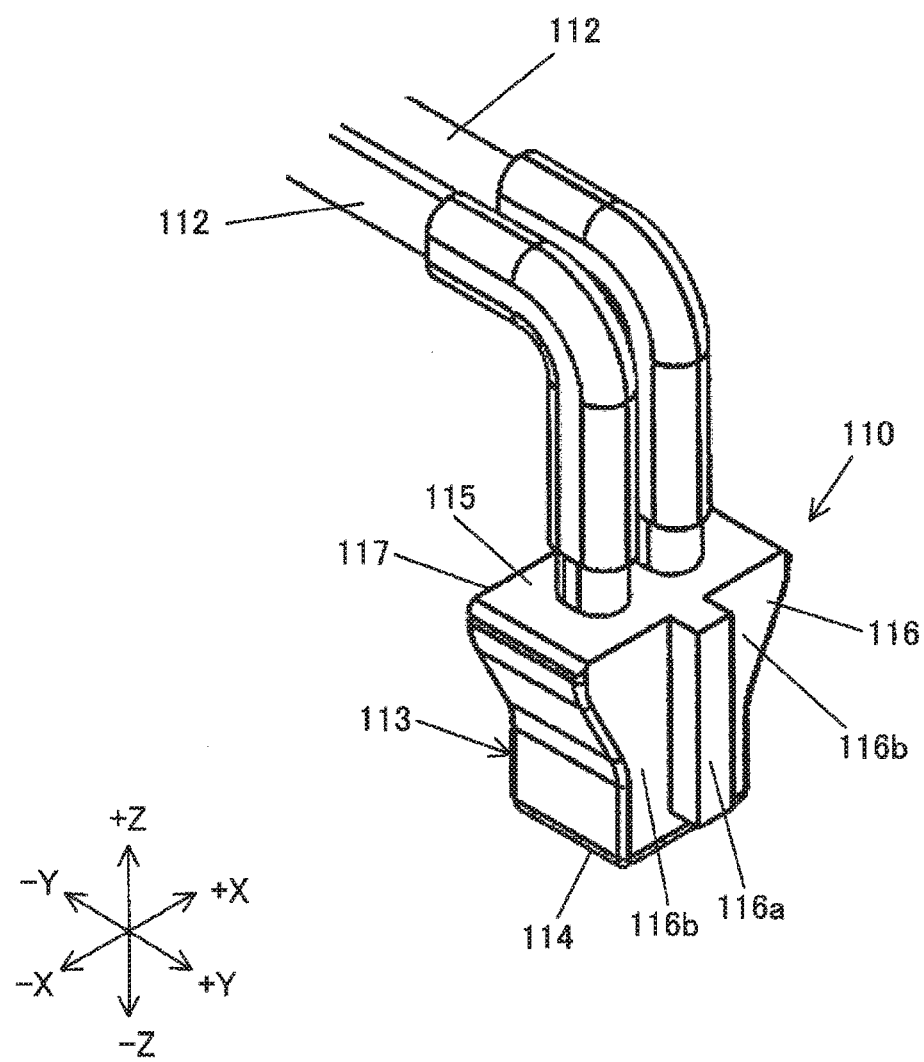
FIG. 7 is a perspective view of the temperature sensor.
Figure 8:
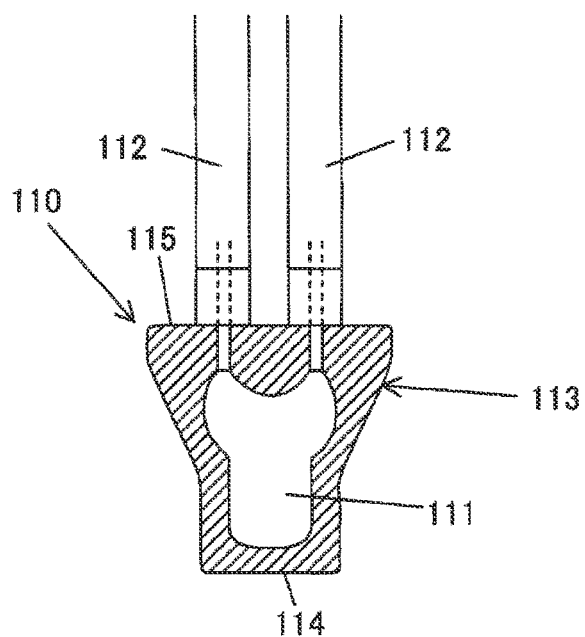
FIG. 8 is a cross-sectional schematic diagram of the temperature sensor.

FIG. 7 is a perspective view of the temperature sensor 110 and FIG. 8 is a cross-sectional schematic diagram of the temperature sensor 110. FIG. 8 schematically illustrates a cross-section obtained by cutting the temperature sensor 110 along the XZ plane. The temperature sensor 110 includes a heat sensitive element 111 (refer to FIG. 8), lead wires 112 connected to electrodes of the heat sensitive element 111, and a protection portion 113 covering an entire portion of the heat sensitive element 111 and connection portions with the heat sensitive element 111 in the lead wires 112 for protection. In this embodiment, a thermistor is used as the heat sensitive element 111. The protection portion 113 to be a casing of the thermistor is made of ceramics. The protection portion 113 seals the heat sensitive element 111 and connection portions of the heat sensitive element 111 and the lead wires 112, protects the heat sensitive element 111 and the connection portions such that the heat sensitive element 111 and the connection portion do not directly contact the unit battery 101 to be a temperature measurement object or an atmosphere, and secures a waterproof effect and a reinforcement effect.

The protection portion 113 has a contact surface 114 contacting the contact region 108e of the external surface of the battery lid 108, a pressing surface 115 which the pressing blade 120 contacts, an outside engagement portion 116 (refer to FIG. 7) engaging with the outside regulation plate 183, and an inside engagement surface 117 (refer to FIG. 7) engaging with the inside regulation plate 184.

The contact surface 114 and the pressing surface 115 are rectangular flat surfaces and are formed to be parallel to each other. The pressing surface 115 is formed to have an area larger than an area of the contact surface 114 to secure a contact region of the pressing blade 120. The lead wire 112 extends from a center portion of the pressing surface 115 to the outside and the pressing blade 120 contacts the pressing surface 115 at the outside of the X direction of the lead wire 112.

As illustrated in FIG. 7, the outside engagement portion 116 has a fitting protrusion portion 116a extending in the Z direction at the center of the X direction and flat planar portions 116b provided in the +X side and the −X side of the fitting protrusion portion 116a, respectively. The fitting protrusion portion 116a has a rectangular shape in a cross-section cut along the XY plane and protrudes from the planar portion 116b in the Y direction. The inside engagement surface 117 is a flat surface that is parallel to the planar portion 116b of the outside engagement portion 116.

As illustrated in FIG. 6, the outside regulation plate 183 has a fitting groove 130a fitted into the fitting protrusion portion 116a of the outside engagement portion 116 and flat regulation surfaces 130b provided at the +X side and the −X side of the fitting groove 130a, respectively. The fitting groove 130a has a rectangular shape in a cross-section cut along the XY plane and is recessed from the regulation surface 130b in the +Y direction. The fitting groove 130a extends in the Z direction and a +Z-side end face thereof is opened.

The inside regulation plate 184 is provided with a pair of engagement projections 136 protruding from a surface facing the inside engagement surface 117 of the temperature sensor 110 to the temperature sensor 110 (that is, in the +Y direction). The engagement projection 136 has a semicircular shape in a cross-section cut along the XY plane and extends in the Z direction. A curved surface of the engagement projection 136 contacts the inside engagement surface 117 as described below (refer to FIGS. 9A and 9B).

Figure 9A:
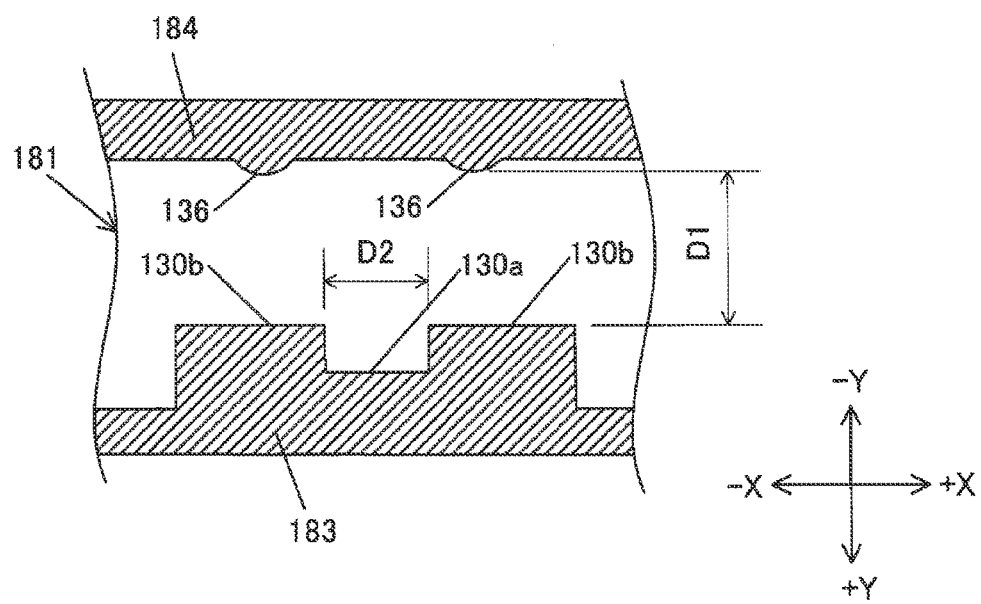
FIGS. 9A and 9B are planar cross-sectional schematic diagrams of the sensor mounting portion.
Figure 9B:
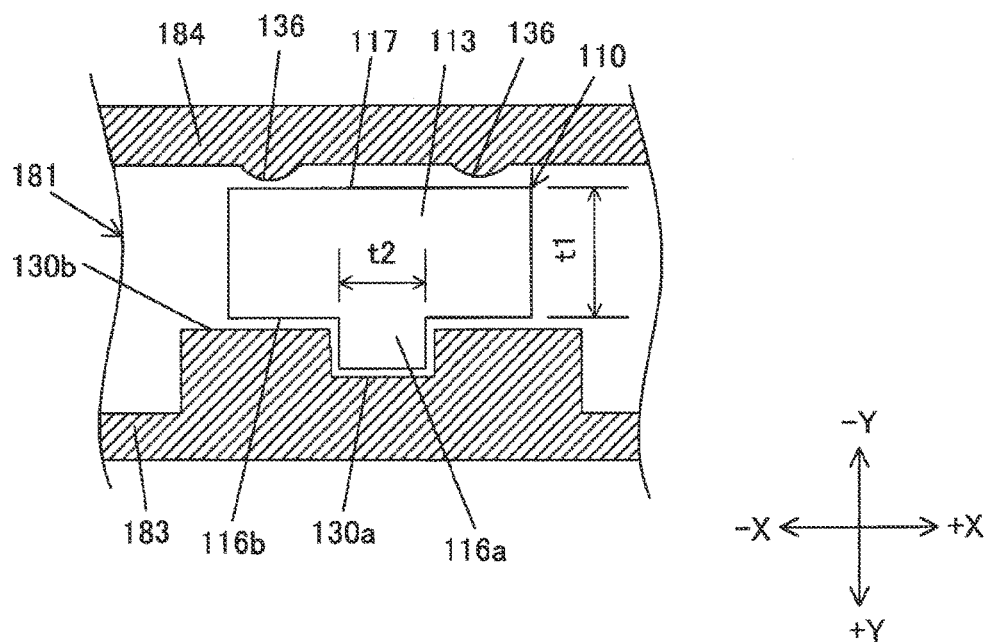

FIGS. 9(a) and 9(b) are planar cross-sectional schematic diagrams of the sensor mounting portion 181. FIG. 9(a) illustrates a state in which the temperature sensor 110 is not mounted and FIG. 9(b) illustrates a state in which the temperature sensor 110 is mounted. In FIG. 9(b), a gap of the temperature sensor 110 and the inside regulation plate 184 and a gap of the temperature sensor 110 and the outside regulation plate 183 are exaggerated and illustrated.

A Y-direction interval D1 of the regulation surface 130b of the outside regulation plate 183 and a top portion of the engagement projection 136 of the inside regulation plate 184 has a dimension equal to a Y-direction width dimension t1 of the protection portion 113, that is, a dimension t1 between the planar portion 116b and the inside engagement surface 117 or slightly larger than the Y-direction width dimension t1. As a result, a movement of the temperature sensor 110 in the Y direction is regulated.

An X-direction dimension D2 of the fitting groove 130a is equal to an X-direction dimension t2 of the fitting protrusion portion 116a or slightly larger than the X-direction dimension t2. As a result, a movement of the temperature sensor 110 in the X direction is regulated.

Figure 10A:
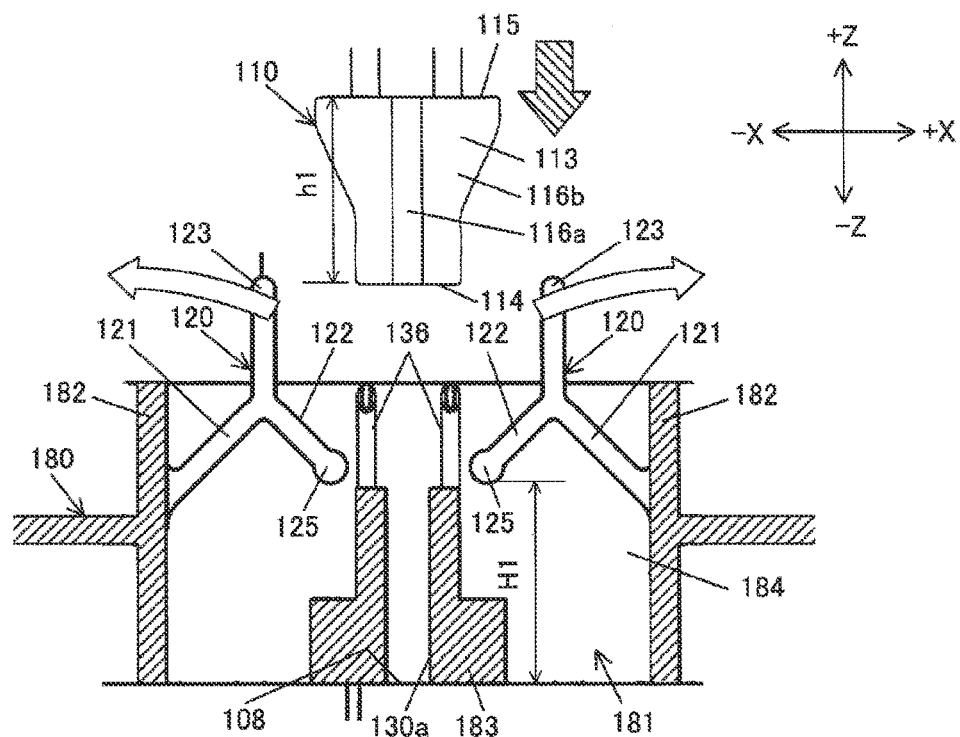
FIG. 10A is a lateral cross-sectional schematic diagram by cutting along the line X-X of FIG. 6
Figure 10B:
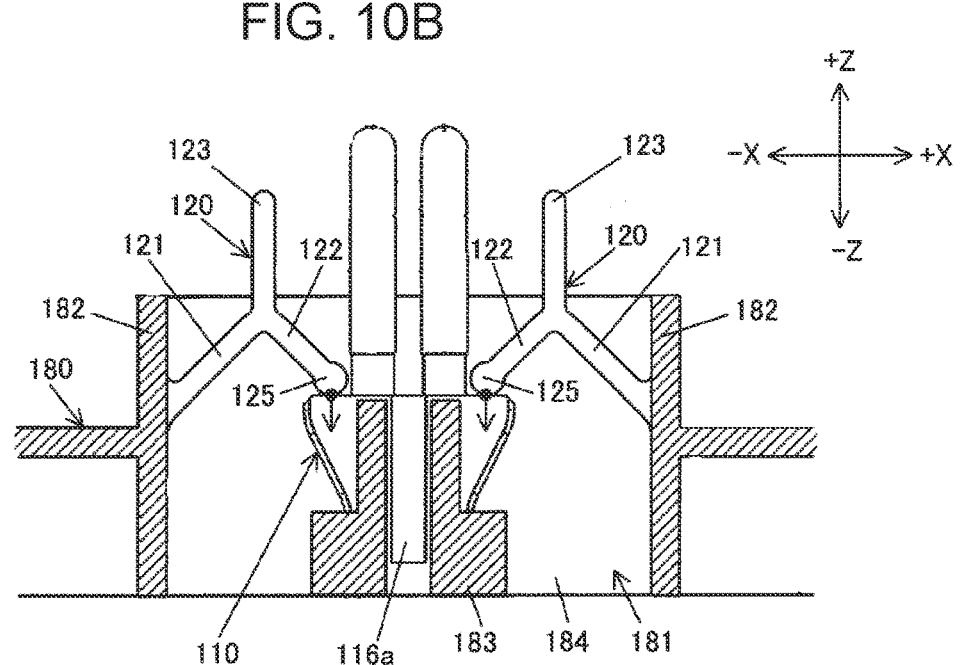
FIG. 10B is a lateral cross-sectional schematic diagram by cutting along the line X-X of FIG. 5.

FIG. 10(a) is a lateral cross-sectional schematic diagram by cutting along the line X-X of FIG. 6 and FIG. 10(b) is a lateral cross-sectional schematic diagram by cutting along the line X-X of FIG. 5. As illustrated in FIGS. 6 and 10(a), the pair of pressing blades 120 has a mirror symmetry structure. The pressing blade 120 is held by the holding plate 182 of the bus bar cover 180.

As illustrated in FIG. 10(a), the pressing blade 120 has a substrate portion 121 extending obliquely upward from the holding plate 182, a pressing piece 122 bent obliquely downward from an upper end of the substrate portion 121 and extending, and an operation piece 123 extending upward (+Z direction) from a boundary portion (bending portion) of the substrate portion 121 and the pressing piece 122. A columnar portion 125 having an arc surface is provided on a lower end of the pressing piece 122. A center axis of the columnar portion 125 extends in the Y direction.

The pair of pressing blades 120 is elastically deformable with a connection portion with the holding plate 182, that is, a base end of the substrate portion 121 as a supporting point. As illustrated in FIG. 10(a), in a state in which the temperature sensor 110 is not mounted, a distance H1 of the Z direction from a −Z-direction end of the columnar portion 125 to the external surface of the battery lid 108 is slightly smaller than a distance from the contact surface 114 of the protection portion 113 to the pressing surface 115, that is, a Z-direction dimension h1 of the protection portion 113 (H1<h1).

As illustrated in FIG. 10(b), if the temperature sensor 110 is mounted on the sensor mounting portion 181, the columnar portion 125 contacts the pressing surface 115 in a state in which the pressing blade 120 is slightly bent and predetermined pressing force is applied to the temperature sensor 110 in a direction toward the battery lid 108, that is, the −Z direction.

When the temperature sensor 110 is mounted, as schematically shown by a void arrow mark in FIG. 10(a), the pressing blade 120 is elastically deformed by pressing and expanding the pair of operation pieces 123. As a result, the pair of columnar portions 125 is separated from each other and a space where the temperature sensor 110 can be inserted is secured. The fitting protrusion portion 116a of the temperature sensor 110 is fitted into the fitting groove 130a of the outside regulation plate 183 and the temperature sensor 110 is moved in a downward direction (−Z direction) until the temperature sensor 110 contacts the battery lid 108. In a state in which the movement of the X direction is regulated by the fitting groove 130a and the movement of the Y direction is regulated by the regulation surface 130b of the outside regulation plate 183 and the engagement projection 136 of the inside regulation plate 184, the temperature sensor 110 is guided to the contact region 108e (refer to FIG. 3) of the battery lid 108. For this reason, positioning can be easily performed.

If the pair of operation pieces 123 pressed and expanded is released, the columnar portion 125 contacts the pressing surface 115 of the temperature sensor 110 and pressing force of a direction toward the battery lid 108, that is, the −Z direction is applied to the temperature sensor 110, as schematically shown by an arrow in FIG. 10(b). That is, the columnar portion 125 has a function as a pressing force transmission portion that can be connected to and separated from the temperature sensor 110 by operating the operation pieces 123 and transmits elastic force (pressing force) generated when the pressing blade 120 is slightly bent to the temperature sensor 110.

As such, the temperature sensor 110 contacts the external surface of the battery lid 108 in a state in which the temperature sensor 110 is pressed to the battery lid 108 by the pair of pressing blades 120 and the movement of the temperature sensor 110 in a direction orthogonal to the pressing direction (Z direction) of the pressing blade 120 is regulated by the outside regulation plate 183 and the inside regulation plate 184. A signal showing the temperature detected by the temperature sensor 110 is output to a control device. The signal showing the temperature is used for charge/discharge control or abnormality detection of the storage module 10, in addition to control of the temperature of the unit battery 101.

According to the first embodiment described above, the following functions and effects are obtained.

(1) The pair of pressing blades 120 to press the temperature sensor 110 to the unit battery 101 and the outside regulation plate 183 and the inside regulation plate 184 to regulate the movements of the temperature sensor 110 in the directions orthogonal to the pressing direction of the pressing blades 120 are provided. The movements of the X direction and the Y direction of the temperature sensor 110 are regulated by the outside regulation plate 183 and the inside regulation plate 184. For this reason, even when a vibration parallel to the XY plane is applied to the storage module 10, a backlash of the temperature sensor 110 is prevented from occurring. As a result, even in a state in which the vibration is applied to the vehicle, the temperature of the unit battery 101 can be detected stably with high precision.

(2) The pair of pressing blades 120 to be the pressing members and the temperature sensor 110 are separated from each other. The columnar portion 125 functioning as the pressing force transmission portion, which can be connected to or separated from the temperature sensor 110 and transmits the pressing force to the temperature sensor 110, is provided in the pressing blade 120. As a result, an appropriate material can be selected for each of the pressing blade 120 and the protection portion 113 of the temperature sensor 110. In this embodiment, the pressing blade 120 is formed of a POM material to be a material having an elastic modulus lower than an elastic modulus of the protection portion 113 and the protection portion 113 is formed of a ceramic material to be a material having thermal conductivity higher than thermal conductivity of the pressing blade 120. As a result, the appropriate pressing force is applied to the temperature sensor 110, so that the temperature sensor 110 can be contacted with the unit battery 101 in a stable state, and a temperature change of the unit battery 101 can be appropriately detected.

(3) The pressing blade 120 is provided in the bus bar cover 180 having the insulating plate 180d disposed between the bus bars 45 adjacent to each other. As a result, the number of components can be reduced as compared with the case in which the pressing blade 120 is provided separately from the bus bar cover 180.

(4) The unit battery 101 includes the battery container that has the battery lid 108 in which the positive electrode terminal 104 and the negative electrode terminal 105 are arranged and the temperature sensor 110 contacts the external surface of the battery lid 108. As a result, the wiring line from the temperature sensor 110 to the control device and the bus bar 45 electrically connecting the unit batteries 101 can be collected to the upper portion of the storage module 10. Although not illustrated in the drawings, because a voltage detection line is connected to the bus bar 45, the voltage detection line is also disposed on the upper portion of the storage module 10. Because the bus bar 45 and the wiring line can be collected, the storage module 10 can be miniaturized.

(5) The gas discharge valve 108b that cleaves under the predetermined pressure and discharges the gas in the container is provided between the positive electrode terminal 104 and the negative electrode terminal 105 in the battery lid 108. The contact surface 114 of the temperature sensor 110 contacts the external surface of the battery lid 108 between the end of the battery lid 108 of the side of the positive electrode terminal 104 and the positive electrode terminal 104. As a result, the duct device 19 is disposed to extend in the X direction at the center of the Y direction of the storage module 10 and the temperature sensor 110 is disposed on the end of the Y direction of the storage module 10, so that the storage module 10 can be miniaturized.

Second Embodiment

A storage module according to a second embodiment will be described with reference to FIGS. 11 to 20. In the drawings, portions equal or equivalent to the portions of the first embodiment are denoted with the same reference numerals and description thereof is omitted. Hereinafter, a difference with the first embodiment will be described in detail. The storage module according to the second embodiment has the same configuration as the configuration of the storage module according to the first embodiment. However, the storage module according to the second embodiment is different from the storage module according to the first embodiment in configurations of a bus bar cover, a temperature sensor, and an elastic force generation structure to apply elastic force to the temperature sensor.

In the first embodiment, a pressing blade 120 to be an elastic force generation portion is provided in a bus bar cover 180. Meanwhile, in the second embodiment, a pressing blade 220 to be an elastic force generation portion is formed in an attachment 250 on which a temperature sensor 110 is mounted, as described below.

Figure 11:
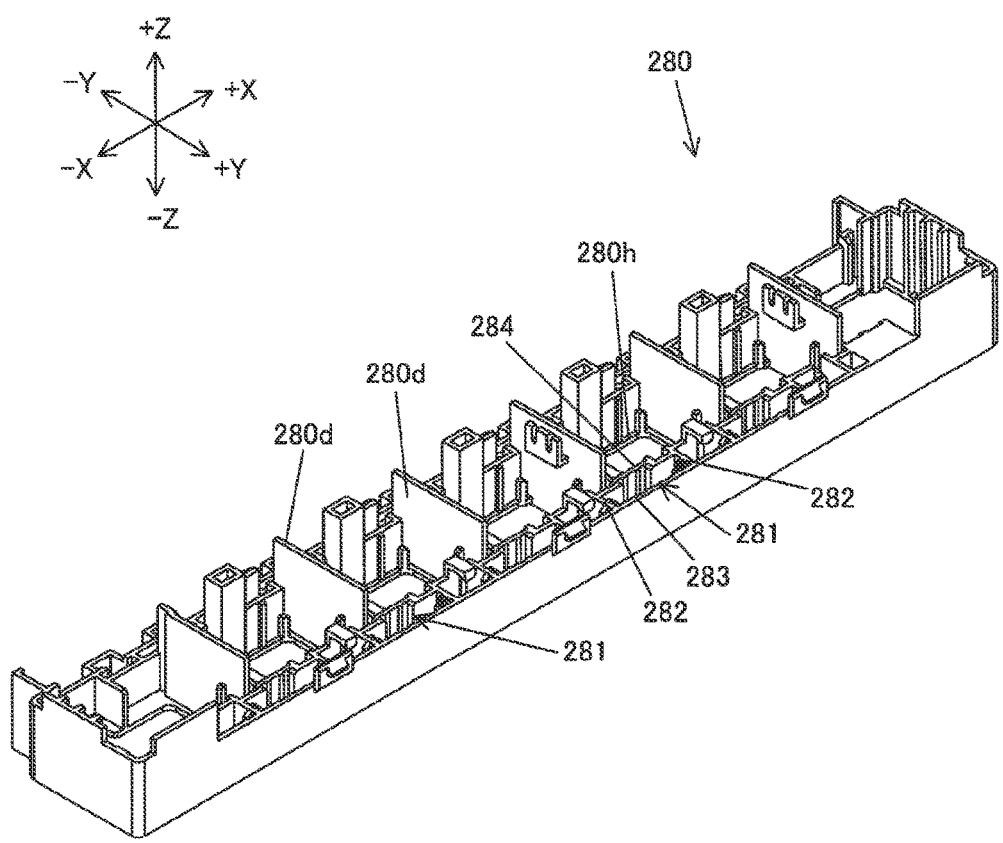
FIG. 11 is a perspective view of a bus bar cover of a storage module according to a second embodiment of the present invention.

FIG. 11 is the same drawing as FIG. 4 and is a perspective view of a bus bar cover 280 of the storage module according to the second embodiment. The bus bar cover 280 is formed of a resin material such as polypropylene (PP). The PP has an elastic modulus lower than an elastic modulus of a POM material. Openings 280h into which a positive electrode terminal 104 and a negative electrode terminal 105 of a unit battery 101 are inserted are formed in the bus bar cover 280. Bus bars 45 (refer to FIGS. 12 and 13) are connected to the positive electrode terminal 104 and the negative electrode terminal 105 protruding from the openings 280h in an upward direction (+Z direction) by laser welding. The positive electrode terminals 104 and the negative electrode terminals 105 of the unit batteries 101 adjacent to each other in an X direction are electrically connected by the bus bars 45.

In the bus bar cover 280, an insulating plate 280d is disposed between one bus bar 45 and other bus bar 45 adjacent to each other and an insulating creeping distance is secured.

A plurality of sensor mounting portions 281 are formed in outside ends of a Y direction (+Y-side ends in the drawings) of a pair of bus bar covers 280. Each sensor mounting portion 281 is formed at a position corresponding to a contact region 108e (refer to FIG. 3) of a temperature sensor 110 between an end of the battery lid 108 of the side of the positive electrode terminal 104 of each unit battery 101 and the positive electrode terminal 104.

The sensor mounting portion 281 forms a space where the temperature sensor 210 is disposed, by a pair of receiving plates 282, an outside regulation plate 283 located at the outside of the Y direction (+Y side in the drawings), and an inside regulation plate 284 located at the inside of the Y direction (−Y side in the drawings).

Figure 13:
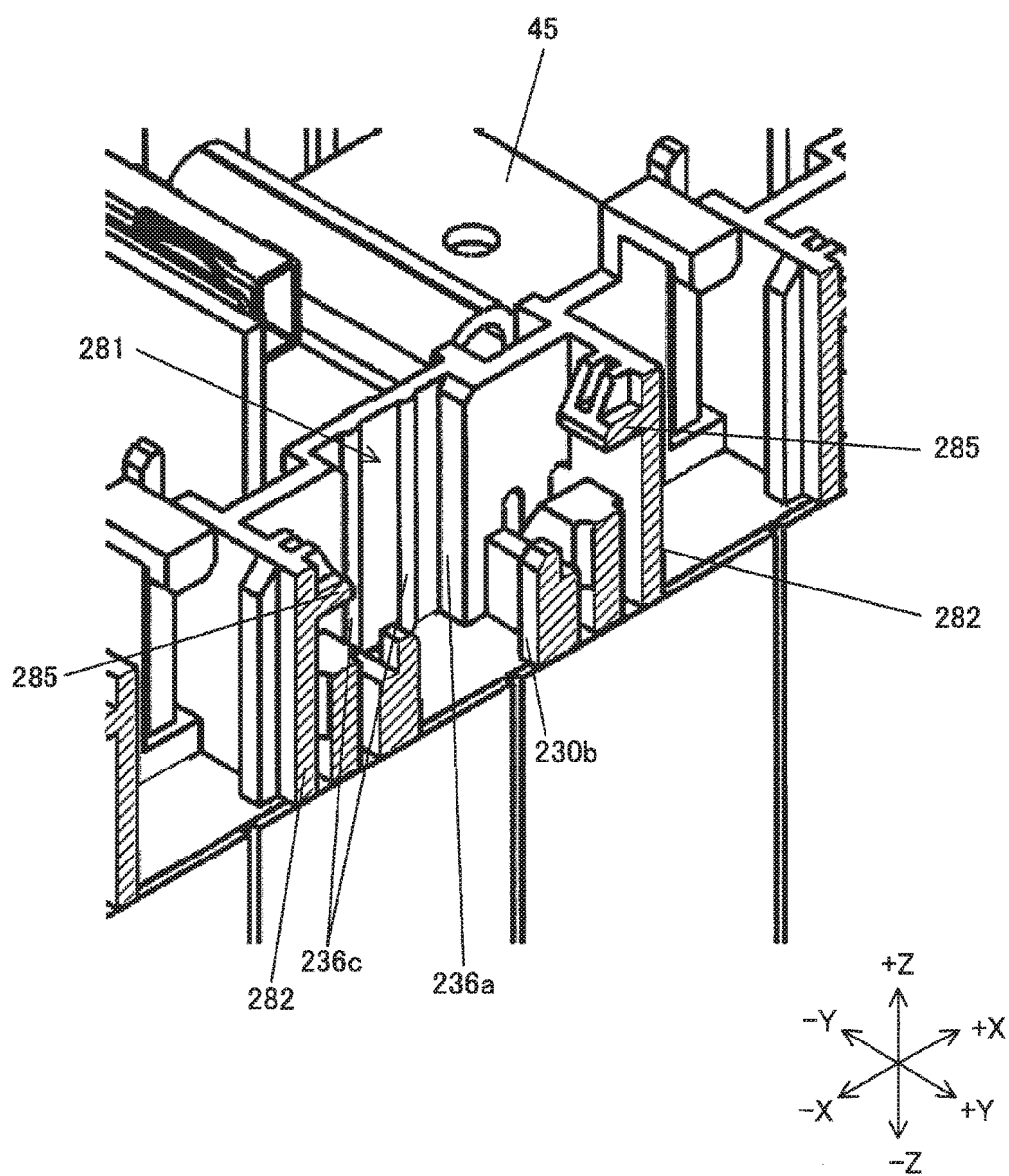
FIG. 13 is a partial cross-sectional enlarged perspective view illustrating the sensor mounting portion on which the temperature sensor is not mounted.

FIGS. 12 and 13 are the same drawings as FIGS. 5 and 6 and are partial cross-sectional enlarged perspective views illustrating the sensor mounting portion 281. In FIGS. 12 and 13, a part of the bus bar cover 280 is cut along an XZ plane to describe the configuration of the sensor mounting portion 281. FIG. 12 illustrates a state in which the temperature sensor 210 is mounted and FIG. 13 illustrates a state in which the temperature sensor 210 is not mounted. Each sensor mounting portion 281 has the same configuration.

As illustrated in FIG. 12, the temperature sensor 210 to detect the temperature of the unit battery 101 is mounted on the sensor mounting portion 281. In the second embodiment, the temperature sensor 210 is mounted on the sensor mounting portion 281 via the attachment 250.

As illustrated in FIG. 13, fitting recess portions 230b and 236a into which both ends of the Y direction of the attachment 250 are fitted are provided in the sensor mounting portion 281. The pair of receiving plates 282 is provided to extend in the Z direction at both sides of the X direction of the fitting recess portion 230b and receiving portions 285 protruding in the X direction are provided in the vicinity of upper ends of the receiving plates 282.

Figure 14:
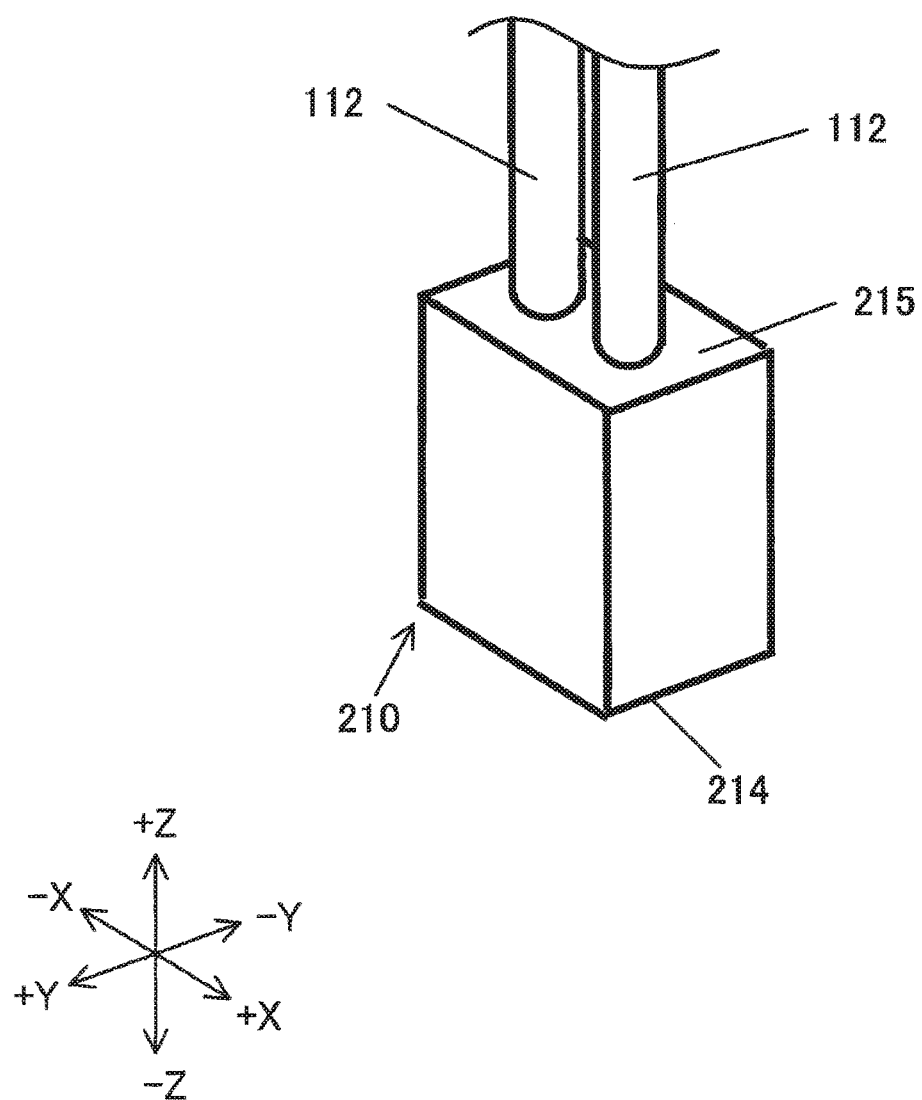
FIG. 14 is a perspective view of the temperature sensor.
Figure 15:
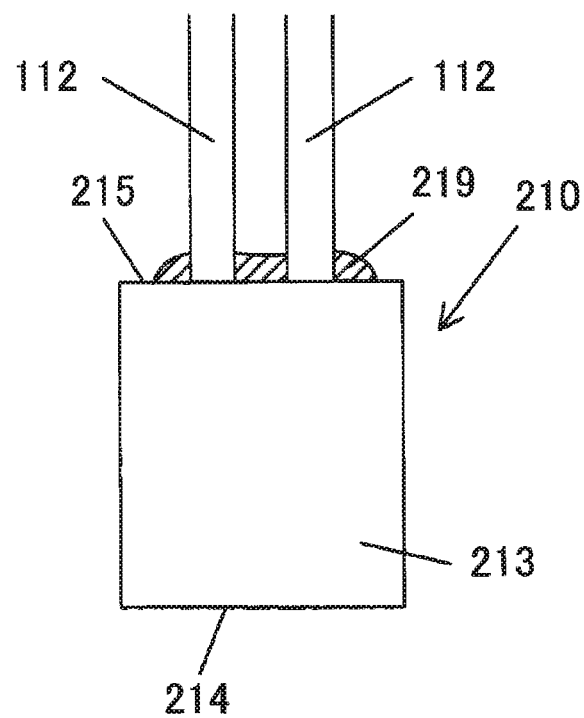
FIG. 15 is a lateral schematic diagram of the temperature sensor.

FIG. 14 is a perspective view of the temperature sensor 210 and FIG. 15 is a lateral schematic diagram of the temperature sensor 210. As illustrated in FIGS. 14 and 15, a protection portion 213 of the temperature sensor 210 has an approximately rectangular parallelepiped shape and has a contact surface 214 contacting the contact region 108e (refer to FIG. 3) of the external surface of the battery lid 108 and a pressing surface 215 which an engagement portion 259 (refer to FIGS. 16(a) and 16(b)) of the attachment 250 to be described below contacts.

Lead wires 112 extend externally from a center portion of the pressing surface 215 of a rectangular shape. In FIG. 15, as schematically shown by hatching, a gap of the lead wire 112 and the pressing surface 215 is sealed by an adhesive 219.

Figure 16A:
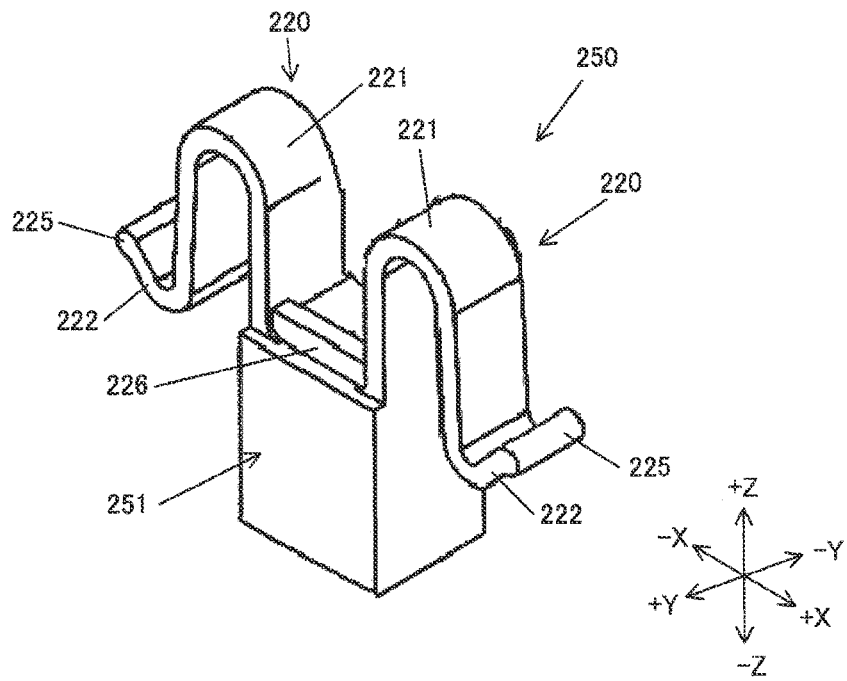
FIGS. 16A and 16B are perspective views of an attachment.
Figure 16B:
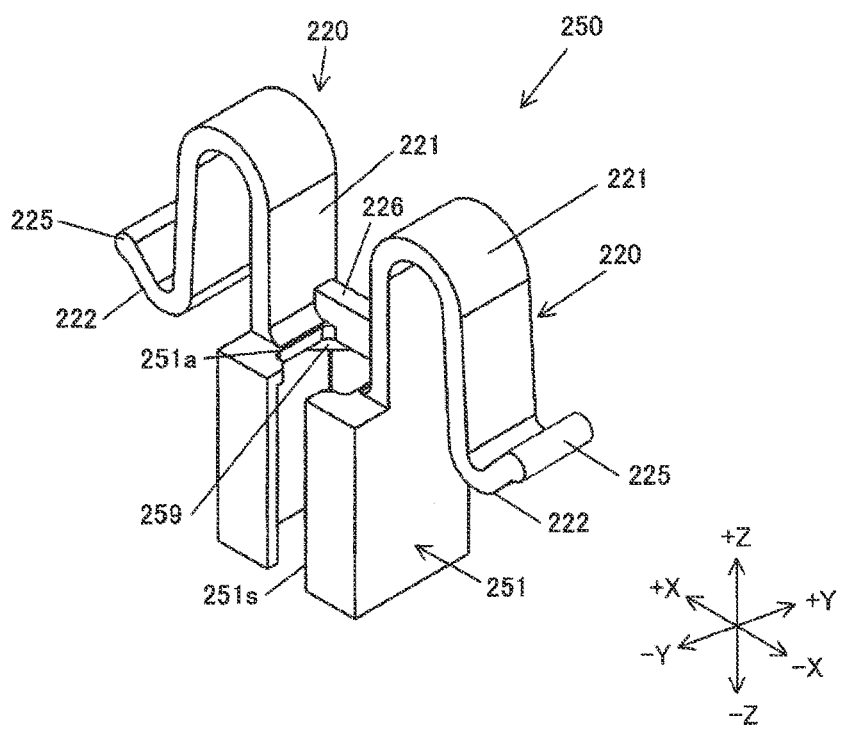

FIG. 16(a) is a perspective view of the attachment 250 and FIG. 16(b) is a perspective view of the attachment 250 when viewed from the side opposite to FIG. 16(a). The attachment 250 includes an accommodation portion 251 that is formed of a POM material and accommodates the temperature sensor 210 and the pair of pressing blades 220 that generates elastic force.

The accommodation portion 251 has a shape of a rectangular box of which a bottom surface is opened and an accommodation space of an approximately rectangular parallelepiped shape corresponding to an external shape of the temperature sensor 210 is formed. An inside dimension of the X direction of the accommodation portion 251 is equal to or slightly larger than a dimension of the X direction of the temperature sensor 210. An inside dimension of the Y direction of the accommodation portion 251 is equal to or slightly larger than a dimension of the Y direction of the temperature sensor 210.

An opening 251a in which the lead wire 112 of the temperature sensor 210 is disposed is formed in a top plate of the accommodation portion 251 and a slit 251s to take in and out the lead wire 112 is formed in a lateral plate of the −Y side. The slit 251s and the opening 251a are continuously formed.

Figure 17:
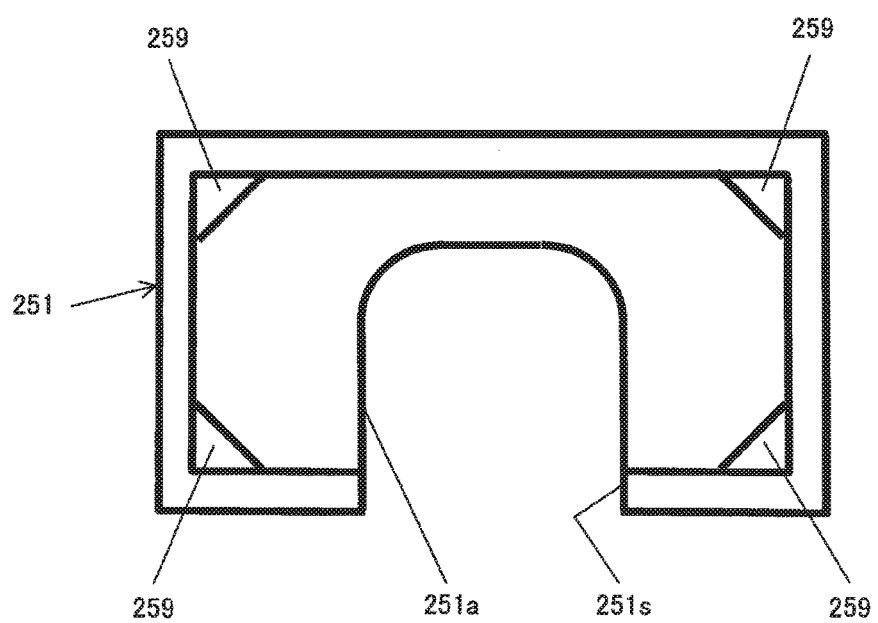
FIG. 17 is a diagram illustrating an accommodation portion when viewed from the lower side.

FIG. 17 is a diagram illustrating the accommodation portion 251 when viewed from the lower side (−Z side). As illustrated in FIG. 17, triangular engagement portions 259 are provided in four corners in the accommodation portion 251. The individual engagement portions 259 are formed to contact four corners of the pressing surface 215 of the temperature sensor 210, when the temperature sensor 210 is accommodated in the accommodation portion 251. That is, the individual engagement portions 259 are provided to avoid the adhesive 219 of the center portion of the pressing surface 215 where the lead wire 112 is located.

As illustrated in FIGS. 16(a) and 16(b), each of the pair of pressing blades 220 includes an inverted U-shaped portion 221 of which a base end is connected to the accommodation portion 251 and a hook portion 222 extending from a leading edge of the inverted U-shaped portion 221. A connection rib 226 that connects the base ends of the pair of pressing blades 220 and raises rigidity of the base ends of the pressing blades 220 is provided on the top plate of the accommodation portion 251.

The inverted U-shaped portion 221 has a first flat plate portion extending upward from a top surface of the accommodation portion 251, an arc-shaped portion bent by 180 degrees from an upper end of the first flat plate portion, and a second flat plate portion extending downward from an end of the arc-shaped portion. The hook portion 222 that is provided in each of the pair of pressing blades 220 is bent from an end of the second flat plate portion of the inverted U-shaped portion 221 and extends obliquely upward. The pair of pressing blades 220 can be elastically deformed in the X direction and the Z direction by the above configuration.

A columnar portion 225 of which a center axis extends in the Y direction is provided in a leading edge of the hook portion 222. An arc surface of the columnar portion 225 engages with the receiving portion 285 of the bus bar cover 280 (refer to FIG. 20(b)).

Figure 18:
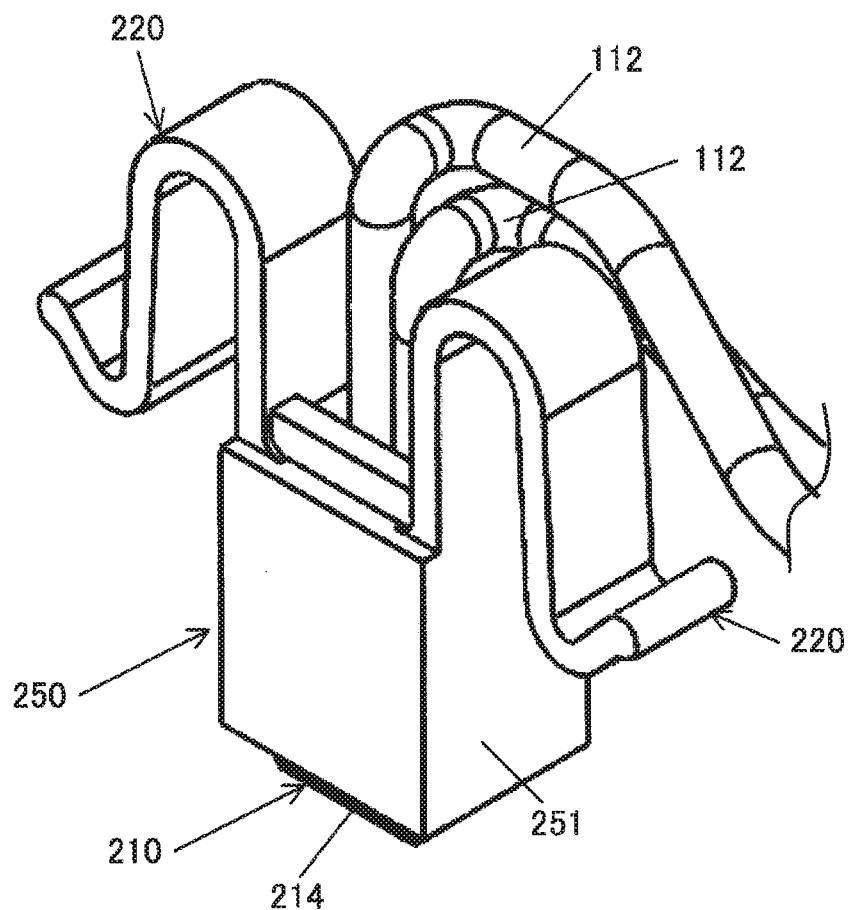
FIG. 18 is a perspective view of the temperature sensor on which the attachment is mounted.
Figure 19:
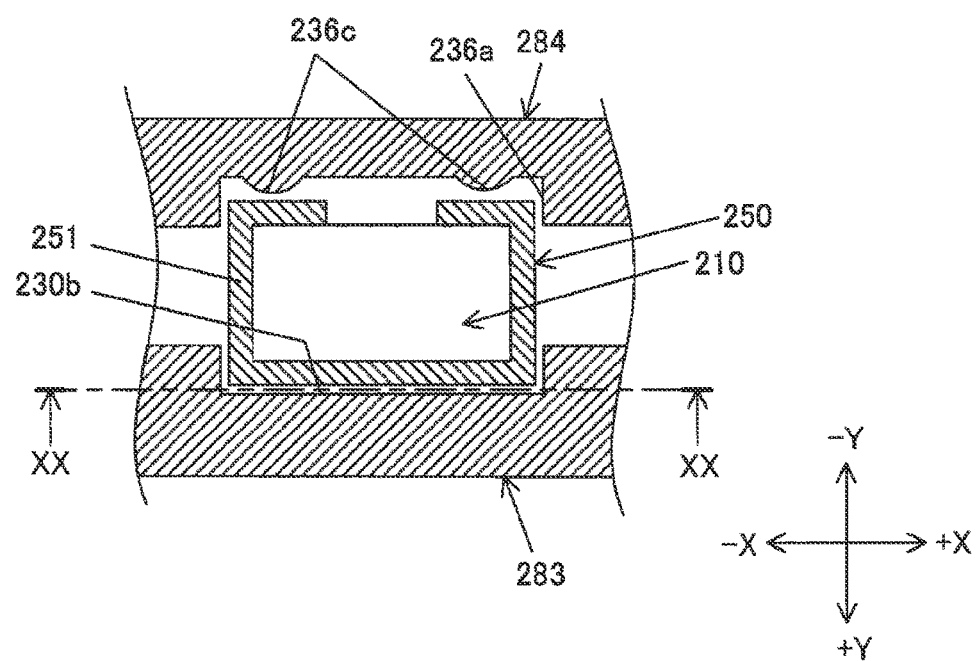
FIG. 19 is a planar cross-sectional schematic diagram of the sensor mounting portion on which the temperature sensor is mounted.

FIG. 18 is a perspective view of the temperature sensor 210 on which the attachment 250 is mounted. FIG. 19 is the same drawing as FIG. 9(b) and is a planar cross-sectional schematic diagram of the sensor mounting portion 281 on which the temperature sensor 210 is mounted. In FIG. 19, a gap of the attachment 250 and the inside regulation plate 284 and a gap of the attachment 250 and the outside regulation plate 283 are exaggerated and illustrated.

As illustrated in FIG. 18, if the temperature sensor 210 is accommodated in the accommodation portion 251 of the attachment 250 and the temperature sensor 210 is mounted on the sensor mounting portion 281, as illustrated in FIG. 19, movements of the temperature sensor 210 in the X direction and the Y direction are regulated by the outside regulation plate 283 and the inside regulation plate 284 via the attachment 250.

As illustrated in FIGS. 12, 13, and 19, the fitting recess portion 230b into which a +Y-side end of the attachment 250 is fitted is provided in the outside regulation plate 283. The fitting recess portion 230b extends from the center of the Z direction of the outside regulation plate 283 in the −Z direction and a +Z-side end face thereof is opened (refer to FIGS. 12 and 13).

The fitting recess portion 236a into which a −Y-side end of the attachment 250 is fitted is provided in the inside regulation plate 284. The fitting recess portion 236a extends in the Z direction and a +Z-side end face thereof is opened. A pair of engagement projections 236c that protrudes to the temperature sensor 110 (that is, in the +Y direction) is provided in a bottom surface of the fitting recess portion 236a. The engagement projection 236c has a semicircular shape in a cross-section cut along the XY plane and extends in the Z direction. A curved surface of the engagement projection 236c contacts a −Y-side lateral surface configuring the accommodation portion 251 of the attachment 250.

As illustrated in FIG. 19, a Y-direction interval of a bottom surface of the fitting recess portion 230b of the outside regulation plate 283 and a top portion of the engagement projection 236c of the inside regulation plate 284 has a dimension equal to or slightly larger than a Y-direction dimension of the accommodation portion 251 of the attachment 250. As described above, the Y-direction inside dimension of the accommodation portion 251 is equal to or slightly larger than the Y-direction dimension of the temperature sensor 210. As a result, the movement of the temperature sensor 210 in the Y direction via the accommodation portion 251 of the attachment 250 is regulated by the outside regulation plate 283 and the inside regulation plate 284.

An inter-lateral surface dimension of the fitting recess portion 230b of the outside regulation plate 283, that is, an X-direction dimension of the fitting recess portion 230b is a dimension equal to or slightly larger than the X-direction outside dimension of the accommodation portion 251 of the attachment 250. Likewise, an inter-lateral surface dimension of the fitting recess portion 236a of the inside regulation plate 284, that is, an X-direction dimension of the fitting recess portion 236a is a dimension equal to or slightly larger than the X-direction outside dimension of the accommodation portion 251 of the attachment 250. As described above, the X-direction inside dimension of the accommodation portion 251 is equal to or slightly larger than the X-direction dimension of the temperature sensor 210. As a result, the movement of the temperature sensor 210 in the X direction via the accommodation portion 251 of the attachment 250 is regulated by the outside regulation plate 283 and the inside regulation plate 284.

Figure 20A:
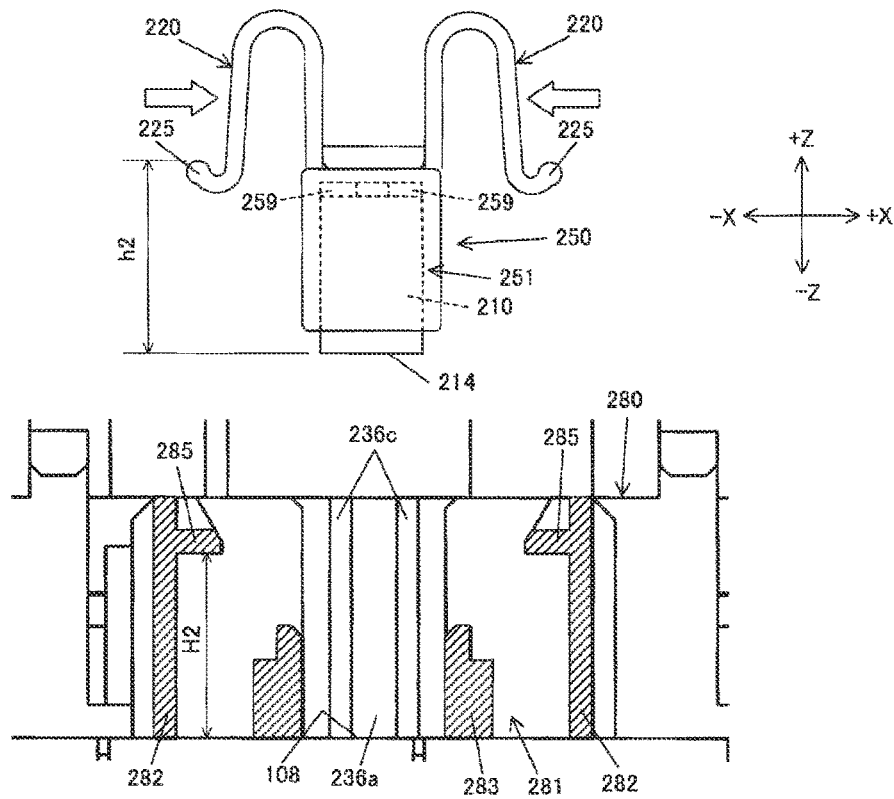
FIG. 20A is a lateral cross-sectional schematic diagram of the sensor mounting portion of FIG. 13 when viewed from the +Y side and FIG. 20B is a lateral cross-sectional schematic diagram of the sensor mounting portion of FIG. 12 when viewed from the +Y side.
Figure 20B:
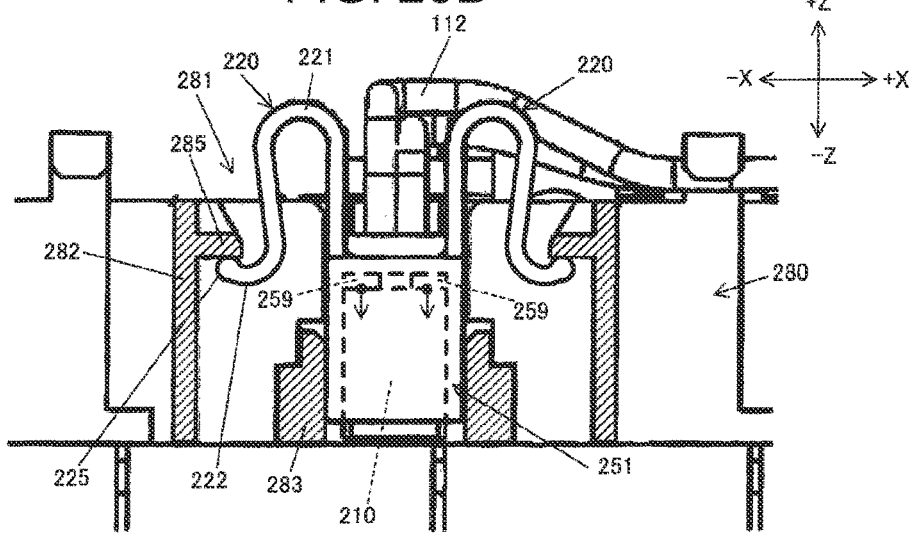

FIG. 20(a) is a lateral cross-sectional schematic diagram of a lateral surface of the sensor mounting portion 281 of FIG. 13 when viewed from the +Y side and FIG. 20(b) is a lateral cross-sectional schematic diagram of the sensor mounting portion 281 of FIG. 12 when viewed from the +Y side. FIGS. 20(a) and 20(b) illustrate cross-sectional views cut along the line XX-XX of FIG. 19. As illustrated in FIG. 20(a), in a state in which the temperature sensor 210 is not mounted, a distance h2 of the Z direction from a +Z-direction end of the columnar portion 225 to the contact surface 214 of the temperature sensor 210 is slightly larger than a distance H2 of the Z direction from the external surface of the battery lid 108 to the −Z-side end face of the receiving portion 285 (H2<h2). The distance h2 is a distance when each engagement portion 259 of the attachment 250 contacts the pressing surface 215 of the temperature sensor 210.

As illustrated in FIG. 20(b), if the temperature sensor 210 is mounted on the sensor mounting portion 281, the columnar portion 225 contacts the −Z-side end face of the receiving portion 285 in a state in which the pressing blade 220 is slightly bent, elastic force generated by the pressing blade 220 is transmitted to the temperature sensor 210 via the engagement portion 259, and predetermined pressing force is applied to the temperature sensor 210 in a direction toward the battery lid 108, that is, the −Z direction. That is, the engagement portion 259 of the attachment 250 has a function as a pressing force transmission portion that can be connected to or separated from the temperature sensor 210 and transmits elastic force (pressing force) generated when the pressing blade 220 is slightly bent to the temperature sensor 210.

When the temperature sensor 210 is mounted, as schematically shown by a void arrow mark in FIG. 20(a), the pressing blades 220 are elastically deformed by pressing the pair of pressing blades 220 from the outside and reducing the pair of pressing blades 220. As a result, the pair of columnar portions 225 approaches each other and the attachment 250 can be inserted therebetween. Both ends of the Y direction of the accommodation portion 251 of the attachment 250 are fitted into the fitting recess portion 230b of the outside regulation plate 283 and the fitting recess portion 236a of the inside regulation plate 284, the temperature sensor 210 and the attachment 250 are moved in the downward direction (−Z direction), and the contact surface 214 of the temperature sensor 210 is contacted with the battery lid 108.

When the temperature sensor 210 is mounted, the movement of the X direction of the temperature sensor 210 on which the attachment 250 is mounted is regulated by the lateral surface of the fitting recess portion 230b of the outside regulation plate 283 and the lateral surface of the fitting recess portion 236a of the inside regulation plate 284. In addition, the movement of the Y direction of the temperature sensor 210 on which the attachment 250 is mounted is regulated by the bottom surface of the fitting recess portion 230b of the outside regulation plate 283 and the engagement projection 236c of the fitting recess portion 236a of the inside regulation plate 284. As such, the temperature sensor 210 is guided to the contact region 108e of the battery lid 108 in a state in which the movement is regulated in the direction orthogonal to the Z direction. For this reason, positioning can be easily performed.

If the pair of pressing blades 220 pressed and reduced is released, the columnar portion 225 contacts the −Z-side end face of the receiving portion 285, the pressing force generated by the pressing blade 220 is transmitted to the temperature sensor 210 via the engagement portion 259, and the pressing force of a direction toward the battery lid 108 is applied to the temperature sensor 210, as schematically shown by an arrow in FIG. 20(b). The temperature sensor 210 contacts the external surface of the battery lid 108 in a state in which the temperature sensor 210 is pressed to the battery lid 108 by the pair of pressing blades 220 and the movements of the temperature sensor 210 in the directions orthogonal to the pressing direction (Z direction) of the pressing blade 220 are regulated by the outside regulation plate 283 and the inside regulation plate 284.

According to the second embodiment described above, the same functions and effects as the functions and effects (1), (2), (4), and (5) described in the first embodiment are achieved. Specifically, the movements of the X direction and the Y direction of the temperature sensor 210 are regulated by the outside regulation plate 283 and the inside regulation plate 284 via the attachment 250. For this reason, similar to the function and effect (1) described in the first embodiment, even when a vibration parallel to the XY plane is applied to the storage module 10, a backlash of the temperature sensor 210 is prevented from occurring. As a result, even in a state in which the vibration is applied to the vehicle, the temperature of the unit battery 101 can be detected stably with high precision.

In addition, similar to the function and effect (2) described in the first embodiment, because the pair of pressing blades 220 to be the pressing members and the temperature sensor 210 are separated from each other, an appropriate material can be selected for each of the pressing blade 220 and the protection portion 213 of the temperature sensor 210. In this embodiment, the pressing blade 220 is formed of a POM material to be a material having an elastic modulus lower than an elastic modulus of the protection portion 213 and the protection portion 213 is formed of a ceramic material to be a material having thermal conductivity higher than thermal conductivity of the pressing blade 220. As a result, the appropriate pressing force is applied to the temperature sensor 210, so that the temperature sensor 210 can be contacted with the unit battery 101 in a stable state, and a temperature change of the unit battery 101 can be appropriately detected.

According to the second embodiment, similar to the function and effect (4) described in the first embodiment, the temperature sensor 210 contacts the external surface of the battery lid 108 to be a terminal attachment surface and the bus bar 45 and the wiring line can be collected. Therefore, the storage module 10 can be miniaturized. Similar to the function and effect (5) described in the first embodiment, the contact surface 214 of the temperature sensor 210 contacts the external surface of the battery lid 108 between the end of the battery lid 108 of the side of the positive electrode terminal 104 and the positive electrode terminal 104. Therefore, a duct device 19 is disposed to extend in the X direction, so that the storage module 10 can be miniaturized.

In addition, according to the second embodiment, the following functions and effects are achieved.

(6) The pressing blade 220 uses the POM material to generate the appropriate elastic force. However, because the pressing blade 220 is provided in the attachment 250, a ratio of the POM material used for the storage module 10 can be reduced as compared with the first embodiment in which the pressing blade 120 is provided in the bus bar cover 180. In the second embodiment, because the bus bar cover 280 can be formed of a resin material such as PP cheaper than the POM material, a cost of the storage module 10 can be reduced.

(7) The movement of the temperature sensor 210 is regulated by the outside regulation plate 283 and the inside regulation plate 284 via the attachment 250. The accommodation portion 251 of the attachment 250 is formed in accordance with the external shape of the temperature sensor 210, so that the movement of the temperature sensor 210 can be regulated. Therefore, it is not necessary to form the protection portion 213 of the temperature sensor 210 in a special shape. For example, when the attachment 250 is used, the fitting protrusion portion 116*a* does not need to be formed in the protection portion 113 as in the first embodiment. As a result, the temperature can be detected stably with high precision, without depending on the shape of the temperature sensor.

(8) The lead wires 112 extend from the surface opposite to the contact surface 214 contacting the surface of the unit battery 101 in the temperature sensor 210, that is, the pressing surface 215 and the engagement portions 259 are contacted with the four corners of the pressing surface 215 to avoid the adhesive 219 around the lead wires 112. Therefore, the engagement portions 259 are prevented from contacting the adhesive 219, so that the pressing force can be uniformly applied to the four corners of the pressing surface 215. As a result, a surface pressure can be uniformly generated in the contact surface of the contact surface 214 of the temperature sensor 210 and the battery lid 108.

The following modifications are also included in a range of the present invention and one or more modifications can be combined with the embodiments described above.

Modification 1

In the first embodiment, the example of the case in which the fitting protrusion portion 116*a* is provided in the protection portion 113 of the temperature sensor 110 has been described. However, the present invention is not limited thereto.

Modification 1-1

For example, the temperature sensor 210 described in the second embodiment may be used in the first embodiment. In this case, the movements of the X direction and the Y directions of the temperature sensor 210 can be regulated by providing fitting recess portions 330*b* and 336*a* into which both ends of the Y direction of the protection portion 213 of the temperature sensor 210 are fitted in an outside regulation plate 383 and an inside regulation plate 384, as illustrated in FIG. 21(*a*), instead of providing the fitting protrusion portion 116*a* and the fitting groove 130*a*.

Modification 1-2

Figure 21A:
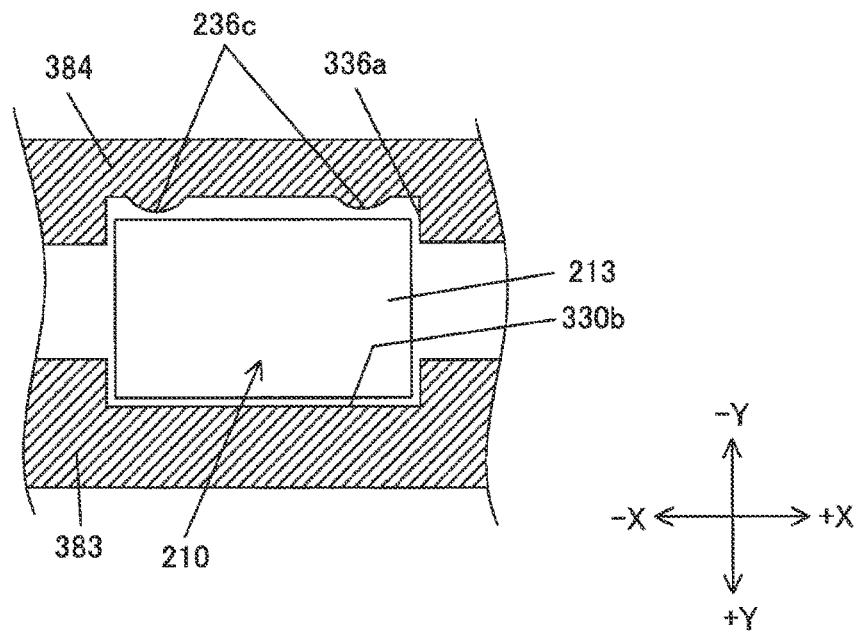
FIGS. 21A and 21B are planar cross-sectional schematic diagrams of a sensor mounting portion of a storage module according to a modification 1 of the present invention.
Figure 21B:
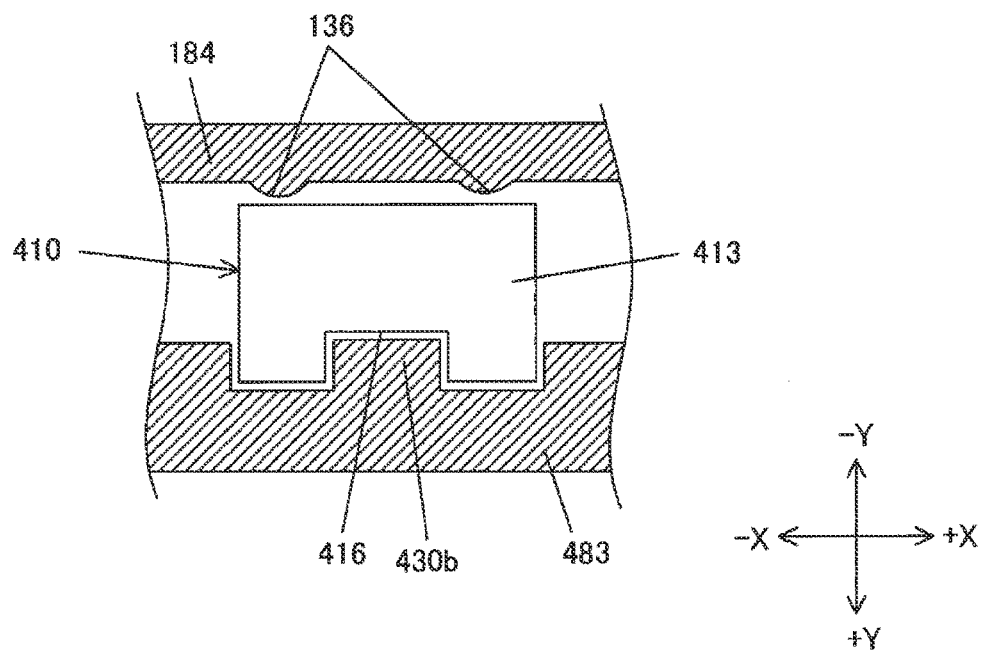

As illustrated in FIG. 21(*b*), a fitting groove 416 is provided in a protection portion 413 of a temperature sensor 410 and a fitting protrusion portion 430*b* fitted into the fitting groove 416 is provided in an outside regulation plate 483, so that movements of the X direction and the Y direction of the temperature sensor 410 can be regulated.

Modification 2

Figure 22A:
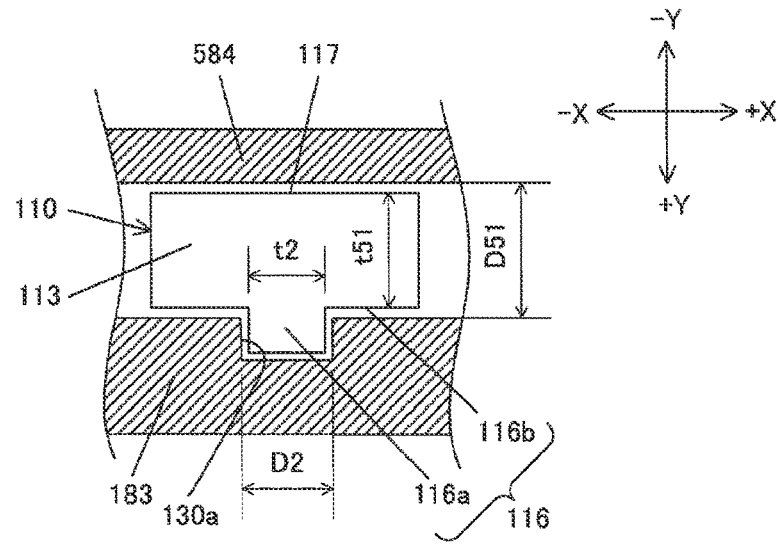
FIGS. 22A to 22C are planar cross-sectional schematic diagrams of a sensor mounting portion of a storage module according to a modification 2 of the present invention.
Figure 22B:
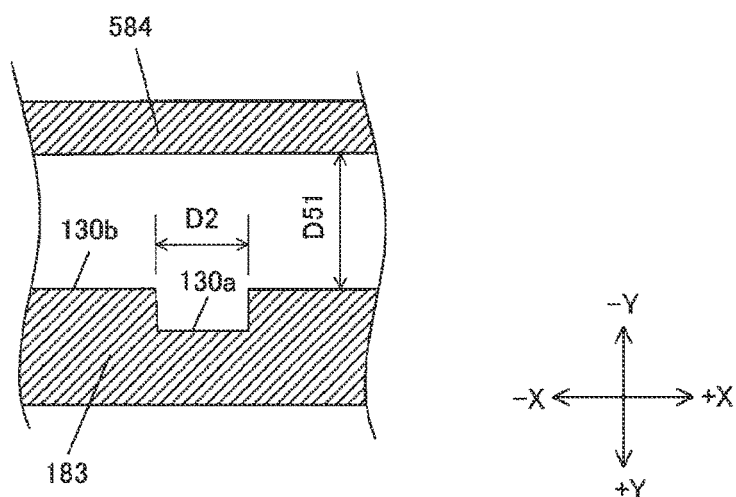
Figure 22C:
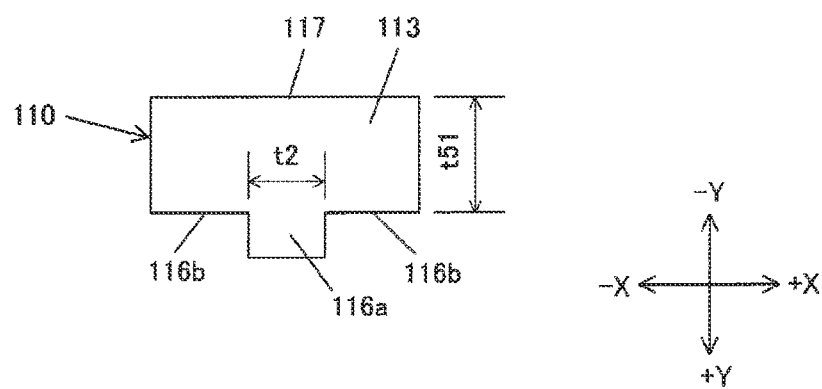

In the first embodiment, the example of the case in which the engagement projection 136 is provided in the inside regulation plate 184 has been described. However, the present invention is not limited thereto. As illustrated in FIGS. 22(*a*) to 22(*c*), the engagement projection 136 may be omitted. In this case, a Y-direction interval D51 of a surface of an inside regulation plate 584 facing the inside engagement surface 117 of the temperature sensor 110 and the regulation surface 130*b* of the outside regulation plate 183 has a dimension equal to or slightly larger than a Y-direction width dimension t51 of the protection portion 113, that is, a dimension t51 between the planar portion 116*b* and the inside engagement surface 117.

Modification 3

The shape of the attachment 250 is not limited to the second embodiment.

Modification 3-1

Figure 23A:
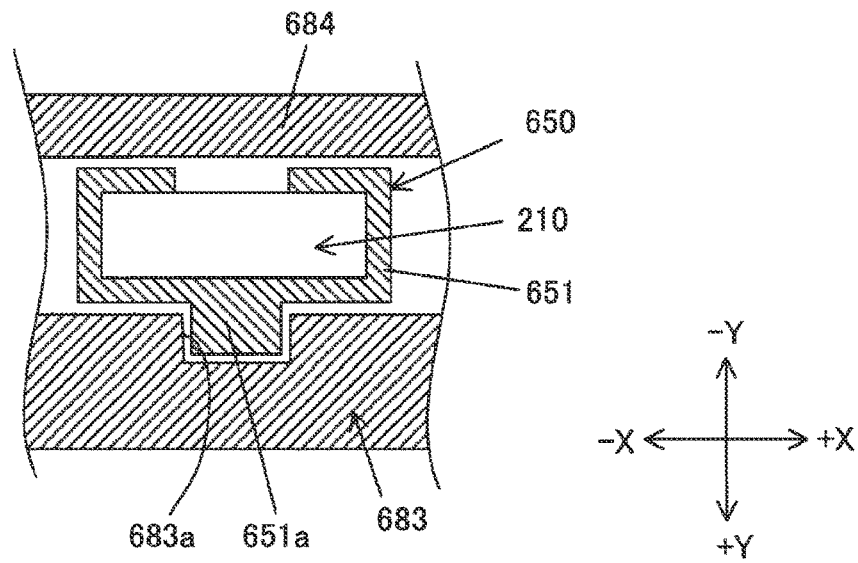
FIGS. 23A and 23B are planar cross-sectional schematic diagrams of a sensor mounting portion of a storage module according to a modification 3 of the present invention.

For example, as illustrated in FIG. 23(*a*), a fitting protrusion portion 651*a* extending in the Z direction may be provided in an accommodation portion 651 of an attachment 650, a fitting groove 683*a* extending in the Z direction may be provided in an outside regulation plate 683, and the fitting protrusion portion 651*a* and the fitting groove 683*a* may be fitted. In FIG. 23(a), an inside regulation plate 684 in which the engagement projection 236c of the inside regulation plate 284 according to the second embodiment is omitted is used.

Modification 3-2

Figure 23B:
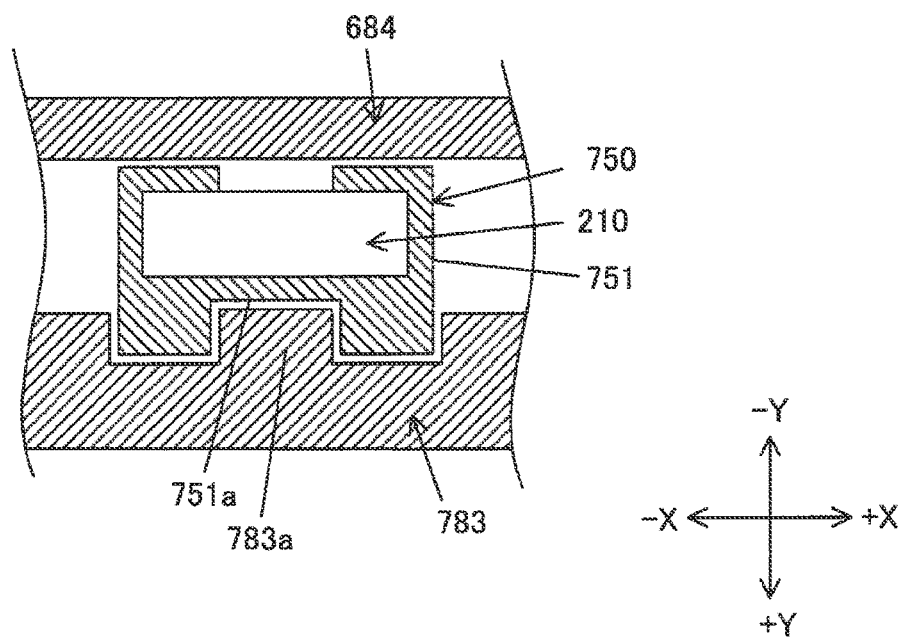

As illustrated in FIG. 23(b), a fitting groove 751a extending in the Z direction may be provided in an accommodation portion 751 of an attachment 750, a fitting protrusion portion 783a extending in the Z direction may be provided in an outside regulation plate 783, and the fitting groove 751a and the fitting protrusion portion 783a may be fitted.

Modification 4

The shape of the engagement portion 259 described in the second embodiment is not limited to the triangular shape.

Figure 24:
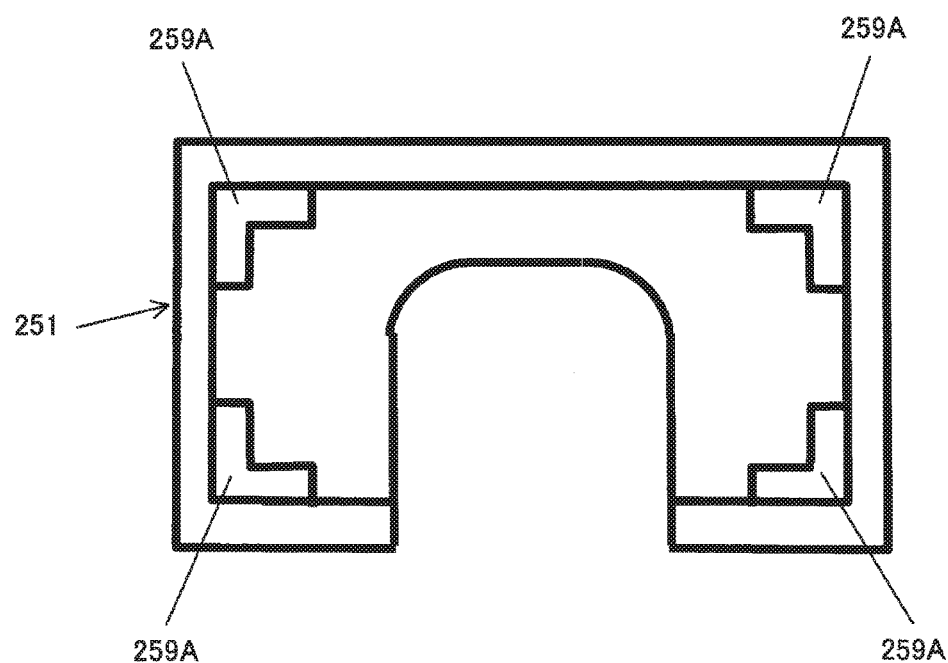
FIG. 24 is a planar cross-sectional schematic diagram of a sensor mounting portion of a storage module according to a modification 4 of the present invention.

For example, as illustrated in FIG. 24, L-shaped engagement portions 259A may be provided at four corners in the accommodation portion 251.

Modification 5

In the embodiments described above, the example of the case in which the contact regions 108e of the temperature sensors 110 and 210 are provided between the end of the battery lid 108 of the side of the positive electrode terminal 104 and the positive electrode terminal 104 has been described. However, the contact regions 108e of the temperature sensors 110 and 210 may be provided between the end of the battery lid 108 of the side of the negative electrode terminal 105 and the negative electrode terminal 105. The temperature sensors 110 and 210 may be contacted with the external surface of the narrow lateral plate 109n and the temperature of the unit battery 101 may be detected, without putting a limitation on the case in which the temperature sensors 110 and 210 are contacted with the external surface of the battery lid 108 to be the terminal attachment surface. For each unit battery 101, the temperature may be detected at a plurality of places.

Modification 6

In the embodiments described above, the example of the case in which the sensor mounting portions 181 and 281 are provided to correspond to all of the unit batteries 101 and the temperatures of all of the unit batteries 101 are detected has been described. However, the present invention is not limited thereto. The sensor mounting portions 181 and 281 may be provided to correspond to a part of the plurality of unit batteries 101 and the temperature of the part of the plurality of unit batteries 101 may be detected.

Modification 7

In the embodiments described above, the example of the case in which the protection portions 113 and 213 are formed of the ceramic material has been described. However, the present invention is not limited thereto. The protection portions 113 and 213 may be formed of a resin material such as a fluorine resin withstanding a high temperature. A material having thermal conductivity higher than thermal conductivity of the material (for example, the POM material) of the pressing blade 120 is selected as the material of the protection portions 113 and 213, so that the heat from the unit battery 101 is efficiently transmitted to the heat sensitive element 111, and the temperature change of the unit battery 101 can be more accurately measured. For this reason, this is preferable. In addition, the material of the pressing blades 120 and 220 can be variously selected. A material having an elastic modulus lower than an elastic modulus of the material (for example, the ceramic material) of the protection portions 113 and 213 is selected as the material of the pressing blades 120 and 220, so that the temperature sensors 110 and 210 can be easily mounted on the sensor mounting portions 181 and 281, and a contact surface pressure of the temperature sensors 110 and 210 and the unit battery 101 can be appropriately secured. For this reason, this is preferable.

Modification 8

In the embodiments described above, the example of the case in which the pressing blades 120 and 220 are formed of the POM material has been described. However, the present invention is not limited thereto. For example, in the first embodiment, when the pressing blades can be disposed at positions capable of securing sufficient insulating creeping distances from the unit battery 101, a configuration in which the temperature sensor 110 is pressed to the battery lid 108 using a plate spring or a coil spring made of a metal may be adopted.

Modification 9

In the embodiments described above, the example of the case in which the present invention is applied to the electric vehicle has been described. However, the present invention is not limited thereto. The present invention can be applied to a storage module embedded in a storage device configuring a power supply device for other motor vehicles, for example, a railroad vehicle such as a hybrid train, a passenger vehicle such as a bus, a goods vehicle such as a truck, and an industrial vehicle such as a battery-type forklift truck.

Modification 10

The lithium ion secondary battery has been described as the example of the storage element. However, the present invention can be applied to other secondary battery such as a nickel-hydrogen battery. In addition, the present invention can be applied to a storage module using an electric double-layer capacitor or a lithium ion capacitor as a storage element.

The present invention is not limited to the embodiments unless characteristics of the present invention are impaired and other forms considered in a range of a technical sprit of the present invention are also included in a range of the present invention.

REFERENCE SIGNS LIST

10 storage module
11 element laminate
13 fixing member
14 control circuit board
15 module cover
16A cell holder
16B cell holder
16c protrusion portion
16f engagement portion
17 end plate
17h screw hole
18 side frame 18a opening
18f flange
18h through-hole
19 duct device
45 bus bar
101 unit battery
104 positive electrode terminal
105 negative electrode terminal
108 battery lid
108a liquid injection plug
108b gas discharge valve
108e contact region
109 battery can
109b bottom plate
109n narrow lateral plate
109w wide lateral plate
110 temperature sensor
111 heat sensitive element
112 lead wire
113 protection portion
114 contact surface
115 pressing surface
116 outside engagement portion
116a fitting protrusion portion
116b planar portion
117 inside engagement surface
120 pressing blade
121 substrate portion
122 pressing piece
123 operation piece
125 columnar portion
130a fitting groove
130b regulation surface
136 engagement projection
180 bus bar cover
180d insulating plate
180f engagement claw
180h opening
181 sensor mounting portion
182 holding plate
183 outside regulation plate
184 inside regulation plate
210 temperature sensor
213 protection portion
214 contact surface
215 pressing surface
219 adhesive
220 pressing blade
221 inverted U-shaped portion
222 hook portion
225 columnar portion
226 connection rib
230b fitting recess portion
236a fitting recess portion
236c engagement projection
250 attachment
251 accommodation portion
251a opening
251s slit
259 engagement portion
259A engagement portion
280 bus bar cover
280d insulating plate
280h opening
281 sensor mounting portion
282 receiving plate
283 outside regulation plate
284 inside regulation plate
285 receiving portion
330b fitting recess portion
383 outside regulation plate
384 inside regulation plate
410 temperature sensor
413 protection portion
416 fitting groove
430b fitting protrusion portion
483 outside regulation plate
584 inside regulation plate
650 attachment
651 accommodation portion
651a fitting protrusion portion
683 outside regulation plate
683a fitting groove
684 inside regulation plate
750 attachment
751 accommodation portion
751a fitting groove
783 outside regulation plate
783a fitting protrusion portion

The invention claimed is:
1. A storage module in which a plurality of storage elements are electrically connected by bus bars, the storage module comprising:
 a temperature sensor which contacts a surface of the storage element and detects a temperature of the storage element;
 a pressing member which presses the temperature sensor to the storage elements;
 a regulation member which regulates a movement of the temperature sensor in a direction orthogonal to a pressing direction of the pressing member; and
 a bus bar cover which has an insulating plate disposed between the bus bars adjacent to each other,
 wherein the pressing member is separated from the temperature sensor,
 a pressing force transmission portion which is connected to or separated from the temperature sensor and transmits pressing force to the temperature sensor is provided in the pressing member,
 the pressing member has an accommodation portion which accommodates the temperature sensor and a pair of elastic force generation portions of which base ends are connected to the accommodation portion,
 a leading edge of the elastic force generation portion engages with a receiving portion of the bus bar cover, and
 the regulation member regulates the movement of the temperature sensor via the accommodation portion.
2. The storage module according to claim 1, wherein the temperature sensor has an approximately rectangular parallelepiped shape and a lead wire extends from a surface opposite to a contact surface contacting the surface of the storage element, and
 the pressing force transmission portion contacts four corners of the surface opposite to the contact surface of the temperature sensor to avoid the lead wire.
3. The storage module according to claim 2, wherein the storage element includes a container which has a terminal attachment surface on which an electrode terminal is disposed, and
 the temperature sensor contacts the terminal attachment surface.

4. The storage module according to claim 3, wherein
an electrode terminal of a positive electrode and an electrode terminal of a negative electrode are disposed on the terminal attachment surface,
a gas discharge valve which cleaves under a predetermined pressure and discharges gas in the container is provided between the positive electrode terminal and the negative electrode terminal, and
the temperature sensor contacts at least one of a portion between an end of the terminal attachment surface of the positive electrode terminal side and the positive electrode terminal and a portion between an end of the terminal attachment s face of the negative electrode terminal side and the negative electrode terminal.

5. The storage module according to claim 2, wherein
the temperature sensor has a heat sensitive element and a sealing portion sealing the heat sensitive element, and
the pressing member is made of a material having an elastic modulus lower than an elastic modulus of the sealing portion.

6. The storage module according to claim 2, wherein
the temperature sensor has a heat sensitive element and a sealing portion sealing the heat sensitive element, and
the sealing portion is made of a material having thermal conductivity higher than thermal conductivity of the pressing member.

7. The storage module according to claim 1, wherein
the storage element includes a container which has a terminal attachment surface on which an electrode terminal is disposed, and
the temperature sensor contacts the terminal attachment surface.

8. The storage module according to claim 7, wherein
an electrode terminal of a positive electrode and an electrode terminal of a negative electrode are disposed on the terminal attachment surface,
a gas discharge valve which cleaves under a predetermined pressure and discharges gas in the container is provided between the positive electrode terminal and the negative electrode terminal, and
the temperature sensor contacts at least one of a portion between an end of the terminal attachment surface of the positive electrode terminal side and the positive electrode terminal and a portion between an end of the terminal attachment surface of the negative electrode terminal side and the negative electrode terminal.

9. The storage module according to claim 1, wherein
the temperature sensor has a heat sensitive element and a sealing portion sealing the heat sensitive element, and
the pressing member is made of a material having an elastic modulus lower than an elastic modulus of the sealing portion.

10. The storage module according to claim 1, wherein
the temperature sensor has a heat sensitive element and a sealing portion sealing the heat sensitive element, and
the sealing portion is made of a material having thermal conductivity higher than thermal conductivity of the pressing member.

* * * * *